United States Patent
Kenjo

(10) Patent No.: US 9,930,258 B2
(45) Date of Patent: *Mar. 27, 2018

(54) IMAGE PROCESSING DEVICE AND IMAGE PROCESSING SYSTEM TO DETERMINE CAPTURING SCHEME FOR CAPTURING A PIXEL VALUE DURING MOVING IMAGE CAPTURE

(71) Applicant: Sony Corporation, Tokyo (JP)

(72) Inventor: Yukinao Kenjo, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 43 days.

This patent is subject to a terminal disclaimer.

(21) Appl. No.: 15/177,860

(22) Filed: Jun. 9, 2016

(65) Prior Publication Data

US 2016/0295114 A1    Oct. 6, 2016

Related U.S. Application Data

(63) Continuation of application No. 14/447,120, filed on Jul. 30, 2014, now Pat. No. 9,398,219.

(30) Foreign Application Priority Data

Aug. 7, 2013  (JP) ................................. 2013-163789

(51) Int. Cl.
  *H04N 5/232*   (2006.01)
  *H04N 5/374*   (2011.01)

(52) U.S. Cl.
  CPC ....... *H04N 5/23267* (2013.01); *H04N 5/2329* (2013.01); *H04N 5/23254* (2013.01); *H04N 5/374* (2013.01)

(58) Field of Classification Search
  None
  See application file for complete search history.

(56) References Cited

U.S. PATENT DOCUMENTS

| | | |
|---|---|---|
| 2009/0167911 A1 | 7/2009 | Takane |
| 2009/0213231 A1 | 8/2009 | Kurokawa |
| 2009/0285301 A1 | 11/2009 | Kurata |
| 2009/0290809 A1 | 11/2009 | Yamada |
| 2010/0149368 A1 | 6/2010 | Yamashita et al. |
| 2010/0182441 A1 | 7/2010 | Fukumoto et al. |
| 2010/0201828 A1 | 8/2010 | Mitsuya et al. |
| 2010/0208087 A1 | 8/2010 | Ogawa |
| 2011/0122265 A1 | 5/2011 | Oryoji |

(Continued)

FOREIGN PATENT DOCUMENTS

JP     2007-208580     8/2007

*Primary Examiner* — Shahbaz Nazrul
(74) *Attorney, Agent, or Firm* — K&L Gates LLP

(57) ABSTRACT

An image processing device is provided. The image processing device includes a determination unit configured to determine a scheme of capturing a pixel value of an imaging element at a time of imaging operation of moving image contents using a feature amount which is obtained from a plurality of regions in a frame which configures the moving image contents; and a correction unit configured to perform a correction of focal plane distortion with respect to the moving image contents based on the determined capturing scheme. An image processing system is also provided.

16 Claims, 16 Drawing Sheets

(56) References Cited

U.S. PATENT DOCUMENTS

| | | | |
|---|---|---|---|
| 2011/0176014 A1* | 7/2011 | Hong | H04N 5/145 348/208.4 |
| 2011/0267514 A1* | 11/2011 | D'Angelo | H04N 5/2329 348/296 |
| 2013/0076940 A1* | 3/2013 | Kimura | H04N 5/23254 348/229.1 |
| 2014/0071299 A1 | 3/2014 | Grundmann | |
| 2015/0085150 A1 | 3/2015 | Silverstein | |

* cited by examiner

FIG. 6

| MOTION OF CMOS IMAGE SENSOR | VERTICAL IMAGING DIRECTION | IMAGED IMAGE |
|---|---|---|
| NONE | FORWARD DIRECTION | a |
| NONE | BACKWARD DIRECTION | a |
| FROM LEFT TO RIGHT | FORWARD DIRECTION | b |
| FROM LEFT TO RIGHT | BACKWARD DIRECTION | c |
| FROM RIGHT TO LEFT | FORWARD DIRECTION | c |
| FROM RIGHT TO LEFT | BACKWARD DIRECTION | b |
| FROM ABOVE TO BELOW | FORWARD DIRECTION | d |
| FROM ABOVE TO BELOW | BACKWARD DIRECTION | e |
| FROM BELOW TO ABOVE | FORWARD DIRECTION | e |
| FROM BELOW TO ABOVE | BACKWARD DIRECTION | d |

Columns labeled 271, 272, 273.

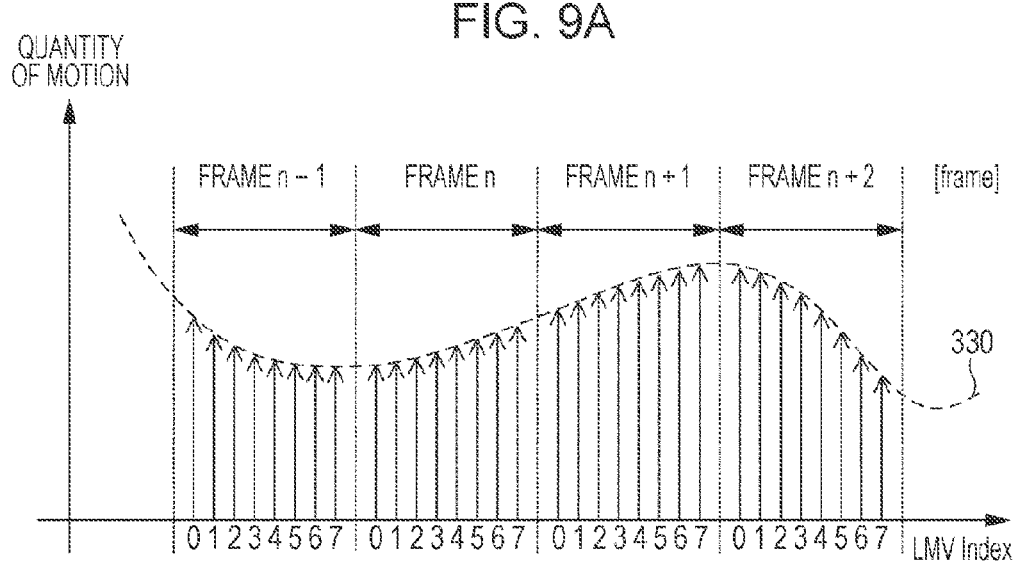
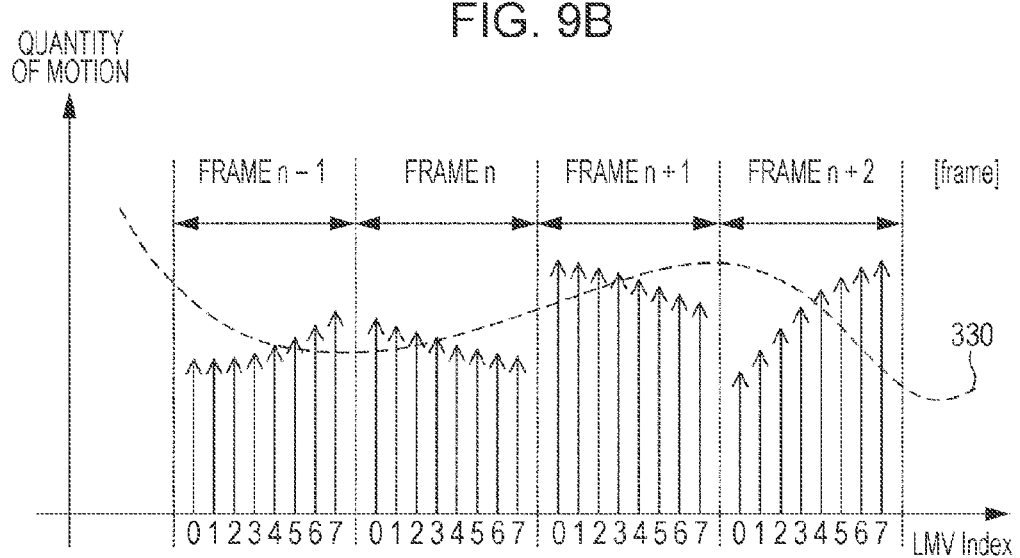

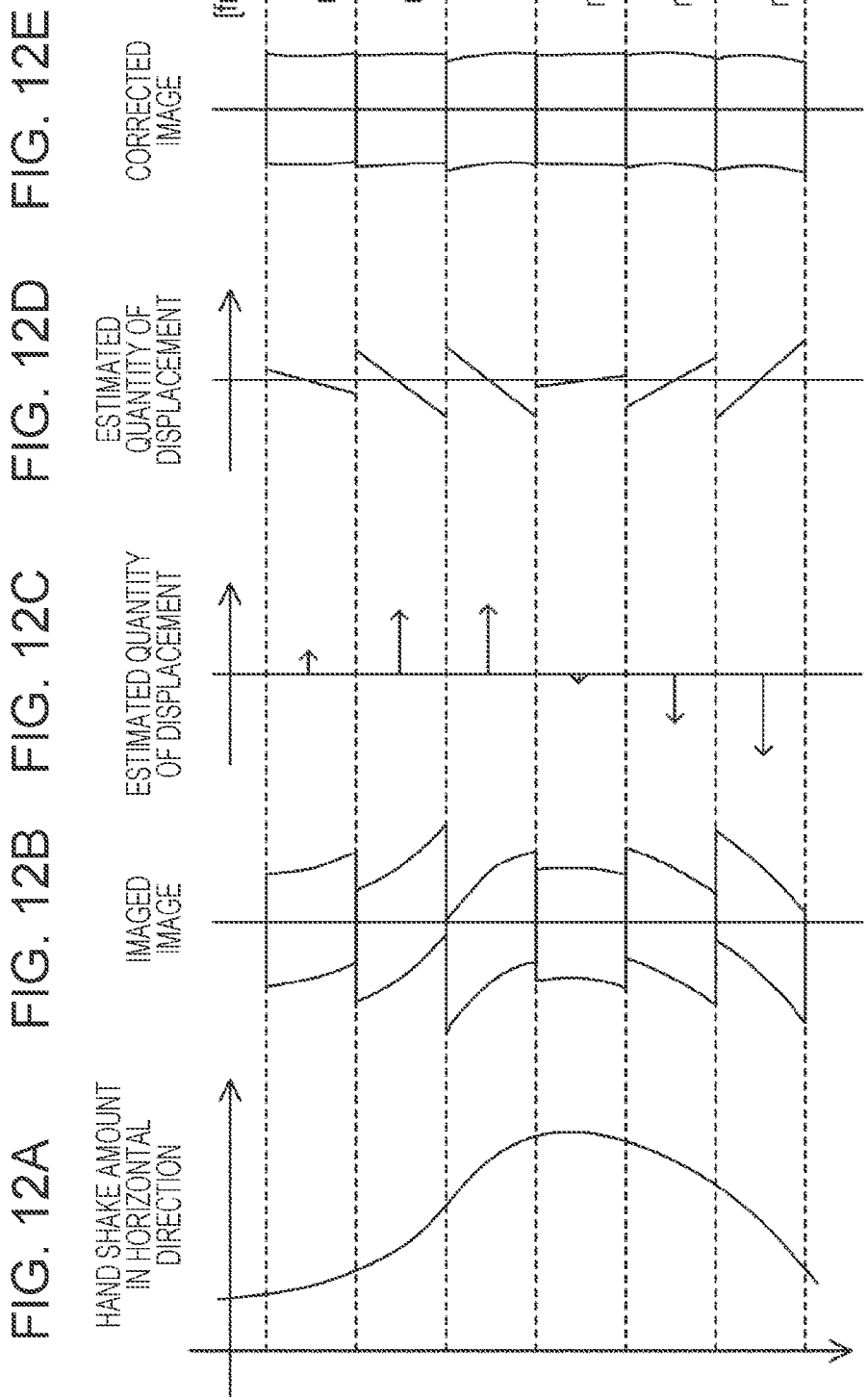

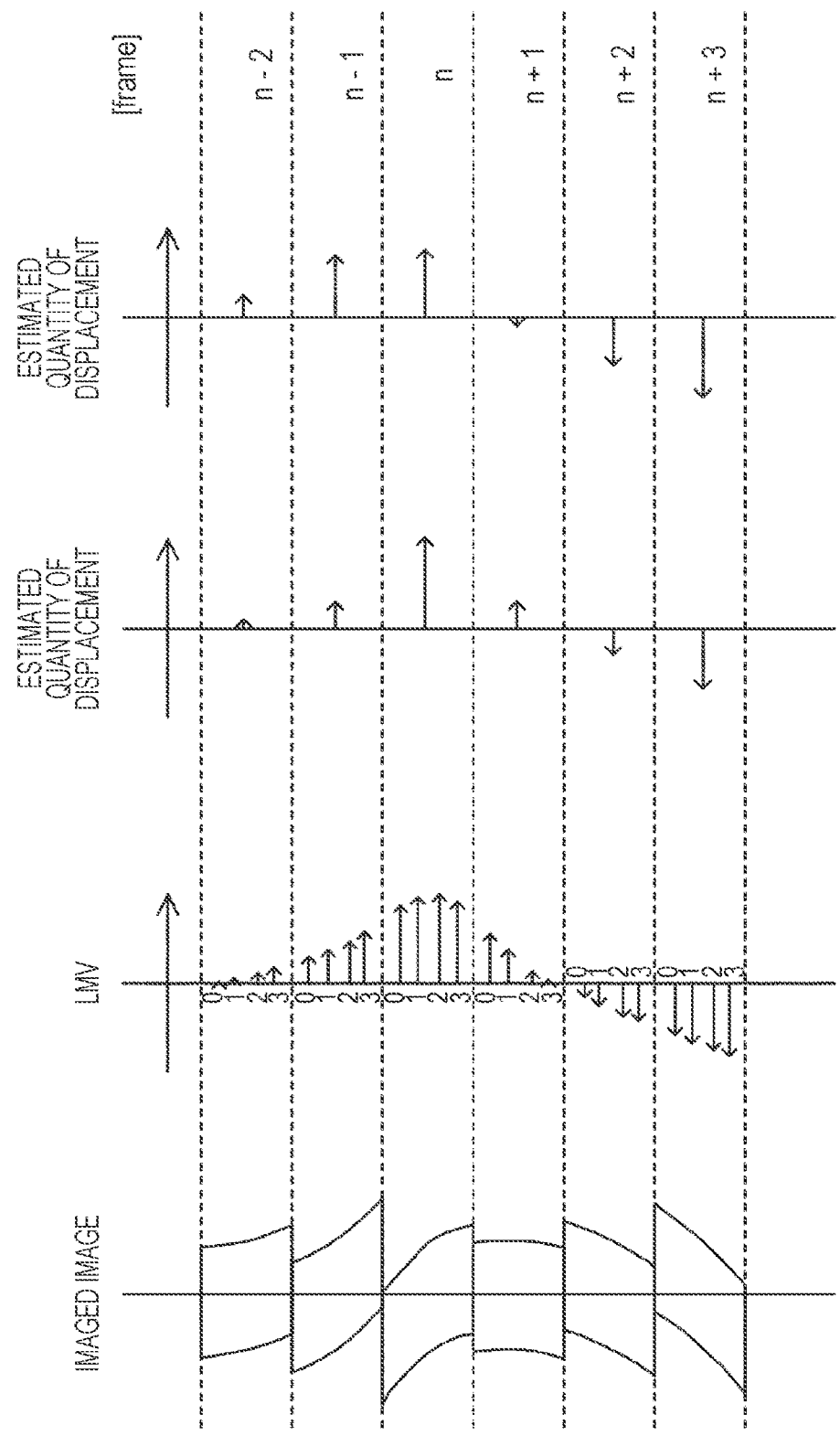

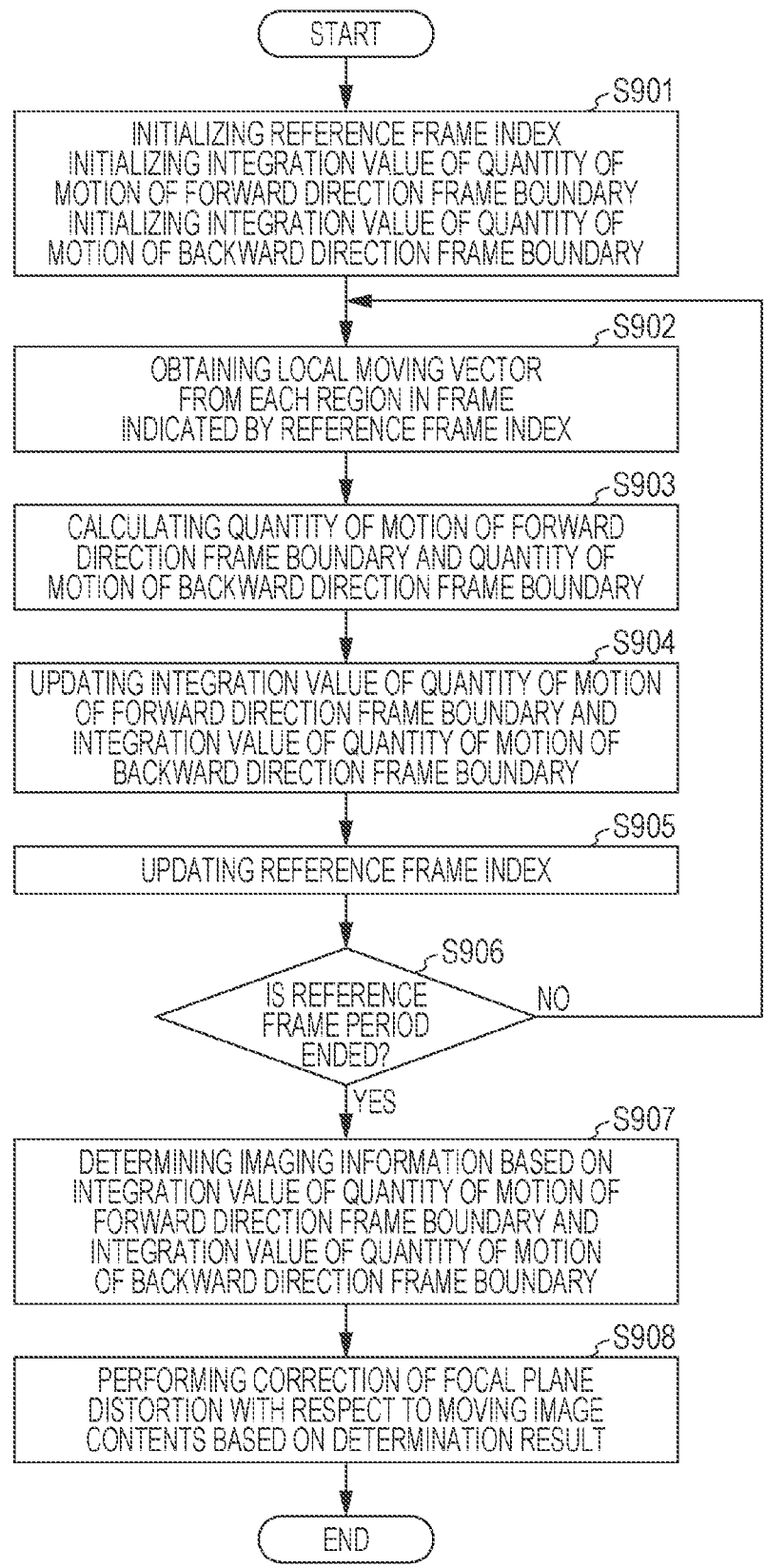

IMAGE PROCESSING DEVICE AND IMAGE PROCESSING SYSTEM TO DETERMINE CAPTURING SCHEME FOR CAPTURING A PIXEL VALUE DURING MOVING IMAGE CAPTURE

CROSS REFERENCES TO RELATED APPLICATIONS

The present application is a continuation of U.S. application Ser. No. 14/447,120, filed Jul. 30, 2014, which claims priority to Japanese Priority Patent Application JP 2013-163789 filed in the Japan Patent Office on Aug. 7, 2013, the entire content of which is hereby incorporated by reference.

BACKGROUND

The present application relates to an image processing device. Specifically, the present application relates to an image processing device which handles an image, an image processing method, and a program which causes the method to be executed in a computer.

In the related art, an image processing device such as an imaging apparatus which generates an image (image data) by imaging an object such as a person using an image sensor has become widespread. In addition, as the image sensor, for example, there is a Complementary Metal Oxide Semiconductor (CMOS) image sensor, or a Charge Coupled Device (CCD) image sensor. In addition, an image processing device such as a reproducing device which reproduces an image which is generated in this manner has been widely spread.

For example, a correction device which corrects distortion of an imaged image (focal plane distortion) due to a focal plane phenomenon which occurs in the CMOS image sensor, or the like, has been proposed (for example, refer to Japanese Unexamined Patent Application Publication No. 2007-208580).

SUMMARY

In the above described related art, since a correction in a device such as an imaging device is a target, and a vertical imaging direction of the CMOS image sensor is known in the device, it is possible to appropriately correct focal plane distortion of an imaged image based on the vertical imaging direction.

Here, for example, a case in which moving image contents which are recorded without performing a correction of focal plane distortion using the imaging device are moved to another reproducing device, and are reproduced in the reproducing device will be assumed. In this case, it is assumed that the reproducing device performs a correction of focal plane distortion with respect to the moving image contents, and the moving image contents which are subjected to the correction of the focal plane distortion are reproduced.

However, a case is also assumed in which a vertical imaging direction of the CMOS image sensor when imaging the moving image contents is different. In this case, when the reproducing device performs a correction of focal plane distortion with respect to the moving image contents based on a wrong vertical imaging direction, it is not possible to appropriately correct the focal plane distortion.

In addition, for example, moving image contents which are imaged using a global shutter image sensor (for example, CCD image sensor) do not have focal plane distortion in principle. For this reason, it is not necessary to perform a correction of focal plane distortion with respect to moving image contents which are imaged using the global shutter image sensor.

That is, when handling moving image contents, it is important to appropriately obtain imaging information such as a vertical imaging direction, and a shutter system at a time of the imaging operation, and use the information.

It is desirable to appropriately obtain imaging information at a time of an imaging operation.

According to an embodiment of the present application, there is provided an image processing device which includes a determination unit which determines a scheme of capturing a pixel value of an imaging element at a time of imaging operation of moving image contents using a feature amount which is obtained from a plurality of regions in a frame which configures the moving image contents, an image processing method, and a program which causes the method to be executed in a computer. In this manner, it is possible to determine the capturing scheme of the pixel value of the imaging element when imaging the moving image contents using the feature amount which is obtained from the plurality of regions in the frame which configures the moving image contents.

In the image processing device, the determination unit may determine at least one of an imaging direction and a shutter system of the imaging element at the time of the imaging operation, as the capturing scheme. In this manner, it is possible to determine at least one of the imaging direction and the shutter system of the imaging element at the time of imaging operation, as the capturing scheme.

In the image processing device, the determination unit may make the determination based on continuity of local movement vectors between frames which are neighboring time sequentially among frames which configure the moving image contents, by obtaining the local movement vector in each of the plurality of regions as the feature amount. In this manner, it is possible to determine the capturing scheme of the pixel value of the imaging element at the time of the imaging operation of the moving image contents based on the continuity of the local movement vectors between the frames which are neighboring time sequentially, among the frames which configure the moving image contents.

In the image processing device, the determination unit may obtain a local movement vector for each of the plurality of regions as the feature amount, may set frames which are neighboring time sequentially among frames which configure the moving image contents to a first frame and a second frame, and may make the determination based on a comparison result of a local movement vector which is obtained from a region on one end side in a specific direction of the first frame, and a local movement vector which is obtained from a region on the other end side in the specific direction of the second frame. In this manner, it is possible to determine the capturing scheme of the pixel value of the imaging element at the time of the imaging operation of the moving image contents based on the comparison result of the local movement vector which is obtained from the region on the one end side in the specific direction of the first frame, and the local movement vector which is obtained from the region on the other end side in the specific direction of the second frame.

In the image processing device, the determination unit may make the determination using a value which is calculated based on a comparison result of a first movement vector and a fourth movement vector, and a comparison result of a second movement vector and a third movement vector, the first movement vector being the local movement vector obtained from a region on the one end side of the first frame, the second movement vector being the local movement vector obtained from the region on the other end side of the first frame, the third movement vector being the local movement vector obtained from a region on the one end side of the second frame, and the fourth movement vector being the local movement vector obtained from a region on the other end side of the second frame. In this manner, it is possible to determine the capturing scheme of the pixel value of the imaging element at the time of the imaging operation of the moving image contents using a value which is calculated based on the comparison result of the first movement vector and the fourth movement vector, and the comparison result of the second movement vector and the third movement vector.

In the image processing device, a correction unit which performs a correction of focal plane distortion with respect to the moving image contents based on the determined capturing scheme may be further included. In this manner, it is possible to perform the correction of the focal plane distortion with respect to the moving image contents based on the determined capturing scheme.

In the image processing device, the determination unit may determine at least one of the imaging direction and the shutter system of the imaging element at the time of the imaging operation as the capturing scheme, and the correction unit may perform the correction of the focal plane distortion with respect to the moving image contents based on the determined imaging direction when it is determined that the shutter system is a focal plane shutter system by the determination unit, and may not perform the correction of the focal plane distortion with respect to the moving image contents when it is determined that the shutter system is a global shutter system by the determination unit. In this manner, when it is determined that the shutter system is the focal plane shutter system, the correction of the focal plane distortion is performed with respect to the moving image contents based on the determined imaging direction, and when it is determined that the shutter system is the global shutter system, the correction of the focal plane distortion is not performed with respect to the moving image contents.

In the image processing device, the determination unit may obtain a feature amount in each of the plurality of regions based on a comparison result of a plurality of regions in a target frame which configures the moving image contents and another frame. In this manner, it is possible to obtain a feature amount in each of the plurality of regions based on the comparison result of the plurality of regions in the target frame which configures the moving image contents and another frame.

According to the present application, it is possible to appropriately obtain imaging information at a time of an imaging operation. In addition, effects which are described here are not necessarily limited, and may be any one of effects which are described in the present disclosure.

Additional features and advantages are described herein, and will be apparent from the following Detailed Description and the figures.

BRIEF DESCRIPTION OF THE FIGURES

FIG. 6 is a diagram which illustrates a relationship among a motion of the CMOS image sensor which is the base of the present application, the imaging direction of the CMOS image sensor, and a generation form of focal plane distortion;

FIGS. 9A and 9B are diagrams which illustrate a relationship between a quantity of motion corresponding to a local movement vector which is detected by the determination unit according to the first embodiment of the present application and a region in a frame;

FIGS. 12A to 12E are diagrams which illustrate a relationship between an image as a target of correction processing using the correction unit according to the first embodiment of the present application, an image after the correction and each piece of information used in the correction processing;

FIGS. 13A to 13D are diagrams which illustrate a relationship between the image as the target of the correction processing using the correction unit according to the first embodiment of the present application and each piece of information used in the correction processing;

FIG. 15 is a flowchart which illustrates an example of processing order of the correction processing in the image processing device according to the first embodiment of the present application.

DETAILED DESCRIPTION

Hereinafter, embodiments for executing the present application (hereinafter, referred to as embodiment) will be described. Descriptions will be made in the following order.

Figure 1:
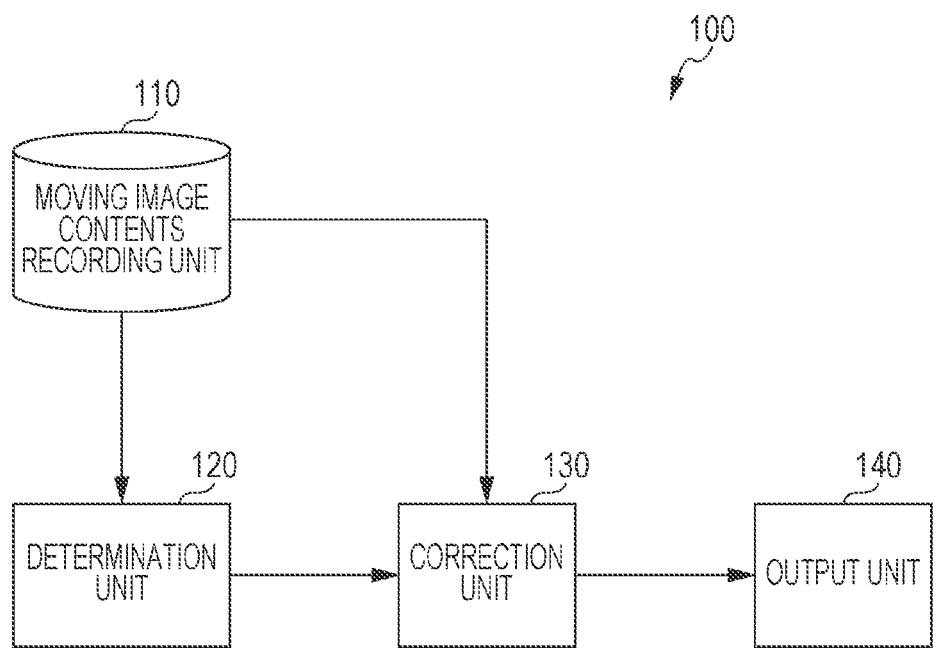
FIG. 1 is a block diagram which illustrates a functional configuration example of an image processing device according to a first embodiment of the present application.

1. First Embodiment (example in which imaging information at time of imaging operation of moving image contents is determined using local movement vector obtained from plurality of regions in frame)
2. Modification Example 1. First Embodiment Configuration Example of Image Processing Device FIG. 1 is a block diagram which illustrates a functional configuration example of an image processing device 100 according to a first embodiment of the present application.

The image processing device 100 includes a moving image contents recording unit 110, a determination unit 120, a correction unit 130, and an output unit 140. The image processing device 100 is, for example, an image processing device such as an imaging device which generates moving image contents by imaging an object, or a reproducing device which reproduces moving image contents. The reproducing device is, for example, a television, a digital video recorder, a hard disk drive (HDD) recorder, a personal computer, a game machine, a projector, and a mobile information processing device (for example, smart phone and tablet terminal). In addition, the imaging device is, for example, a digital still camera or a digital video camera (for example, camera-integrated recorder) which can generate moving image contents by imaging an object.

The moving image contents recording unit 110 records moving image contents (moving image file), and supplies the recorded moving image contents to the determination unit 120 and the correction unit 130. For example, when the image processing device 100 is an imaging device, image data (moving image data) which is generated by an imaging unit (not shown) is recorded in the moving image contents recording unit 110 as moving image contents (moving image file). In addition, the imaging unit is configured of, for example, a Charge Coupled Device (CCD) image sensor, or a Complementary Metal Oxide Semiconductor (CMOS) image sensor. In addition, when the image processing device 100 is a reproducing device which does not have an imaging function, image data (moving image data) which is generated by another imaging device is recorded in the moving image contents recording unit 110 as moving image contents (moving image file). In addition, similarly, when the image processing device 100 is a conversion device (or editing device) which does not have the imaging function, image data (moving image data) which is generated by another imaging device is recorded in the moving image contents recording unit 110 as moving image contents (moving image file). In addition, the conversion device (or editing device) is, for example, a device which performs correction processing such as a correction of focal plane distortion with respect to moving image contents of which imaging information at a time of imaging operation is not known using software for editing moving image contents, software for reproducing moving image contents, or the like. In addition, a device which performs correction processing such as a correction of focal plane distortion with respect to moving image contents of which imaging information at a time of imaging operation is not known may be used as a conversion device (or editing device), in a cloud environment, or the like.

The determination unit 120 determines imaging information at a time of the imaging operation with respect to moving image contents which are recorded in the moving image contents recording unit 110, and outputs a determination result thereof (imaging information) to the correction unit 130. Here, the imaging information at the time of the imaging operation of moving image contents is a scheme of capturing pixel values of the image sensor (imaging element) at the time of imaging operation of the moving image contents. The capturing scheme is at least one of the imaging direction of the imaging sensor at the time of imaging operation and a shutter system of the image sensor.

For example, the determination unit 120 obtains a feature amount (for example, local movement vector) from a plurality of regions in a frame which configures moving image contents which are recorded in the moving image contents recording unit 110. In addition, the determination unit 120 determines a capturing scheme thereof using the obtained feature amount. In addition, the plurality of regions in the frame which configures moving image contents, and a local movement vector which is obtained from the regions will be described in detail with reference to FIGS. 8A to 8C. In addition, a determining method using the determination unit 120 will be described in detail with reference to FIGS. 8A to 10.

The correction unit 130 performs a correction of focal plane distortion with respect to moving image contents which are recorded in the moving image contents recording unit 110 based on a determination result (imaging information) which is output from the determination unit 120. In addition, the correction unit 130 outputs the image (corrected image) which is subjected to the correction processing to the output unit 140.

The output unit 140 outputs the moving image contents which are subjected to the correction processing using the correction unit 130. The output unit 140 can be set to a display unit which displays moving image contents, or an output unit which outputs the moving image contents to another device, for example.

Regarding Principle of Occurring Focal Plane Distortion

Here, an operation of a focal plane shutter of a CMOS image sensor and a principle of occurring focal plane distortion will be described. The CMOS image sensor is an image sensor which is generally used as an image sensor (imaging element) of an imaging device (for example, digital video camera (for example, camera-integrated recorder)).

Configuration Example of CMOS Image Sensor

Figure 2:
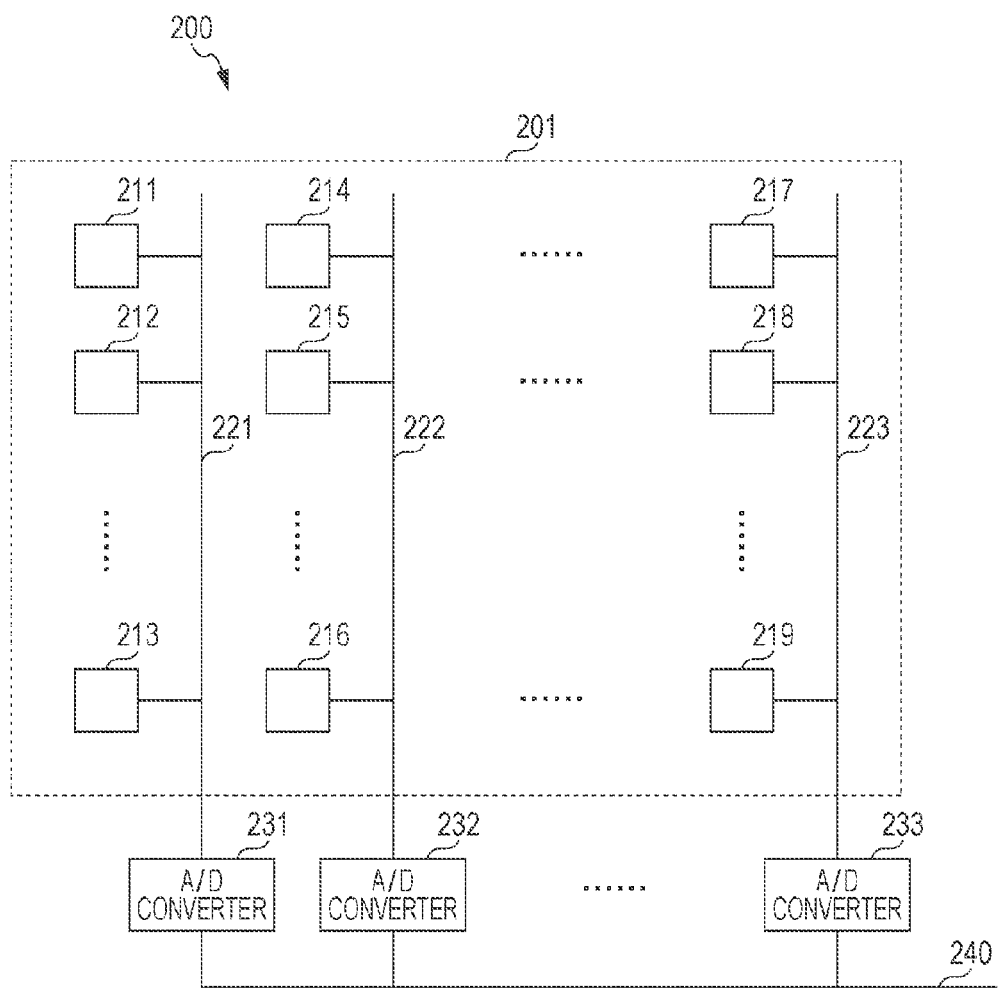
FIG. 2 is a diagram which illustrates a configuration example of a CMOS image sensor which is a base of the present application.

FIG. 2 is a diagram which illustrates a configuration example of a CMOS image sensor 200 which is a base of the present application. In addition, the CMOS image sensor 200 is an example of a general CMOS image sensor.

The CMOS image sensor 200 includes pixels 211 to 219, analog signal lines (vertical signal lines) 221 to 223, A/D converters 231 to 233, and a digital signal line 240. In addition, in FIG. 2, the pixels 211 to 219 which are configured of a photodiode, an amplifier, and the like, are schematically illustrated using rectangles. In addition, in FIG. 2, for ease of description, only nine pixels 211 to 219 are illustrated, and other pixels are not shown. In addition, only analog signal lines 221 to 223 and A/D converters 231 to 233 which correspond to the pixels 211 to 219 are illustrated, and others are not shown.

The pixels 211 to 219 are arranged in a lattice shape in the pixel region 201 of the CMOS image sensor 200. In addition, the pixels 211 to 213 are connected to the A/D converter 231 through the analog signal line 221 in the vertical direction. Similarly, the pixels 214 to 216 are connected to the A/D converter 232 through the analog signal line 222 in the vertical direction, and pixels 217 to 219 are connected to the A/D converter 233 through the analog signal line 223 in the vertical direction.

In addition, in the pixels 211 to 219, the photodiode (light receiving unit) receives light, and the light is accumulated by being converted into a charge. In addition, the accumulated charge is converted into a voltage, and is amplified by the amplifier. The voltage which is amplified in this manner is transferred to the analog signal lines 221 to 223 in each line (each row) due to ON/OFF of a pixel selection switch.

The A/D converters 231 to 233 are an A/D converter which turns an analog signal of each pixel which is input through the analog signal lines 221 to 223 into a digital signal by converting the analog signal, and outputs the converted digital signal to the digital signal line 240.

In this manner, the CMOS image sensor 200 includes the A/D converters 231 to 233 of the same number as the number of pixels in the horizontal direction. For this reason, it is possible to use the A/D converters 231 to 233 by sharing the converters with pixels in the vertical direction. In this manner, it is possible to reduce a circuit area and manufacturing cost. It is possible to simultaneously perform the A/D conversion with respect to the pixels in the horizontal direction, however, it is not possible to simultaneously perform the A/D conversion with respect to the pixels in the vertical direction. For this reason, it is necessary to delay a start timing of an exposure period by a period of time in which at least the A/D conversion is performed with respect to the pixels in the vertical direction. The exposure period will be described in detail with reference to FIG. 3.

Example of Exposure Period of CMOS Image Sensor

Figure 3:
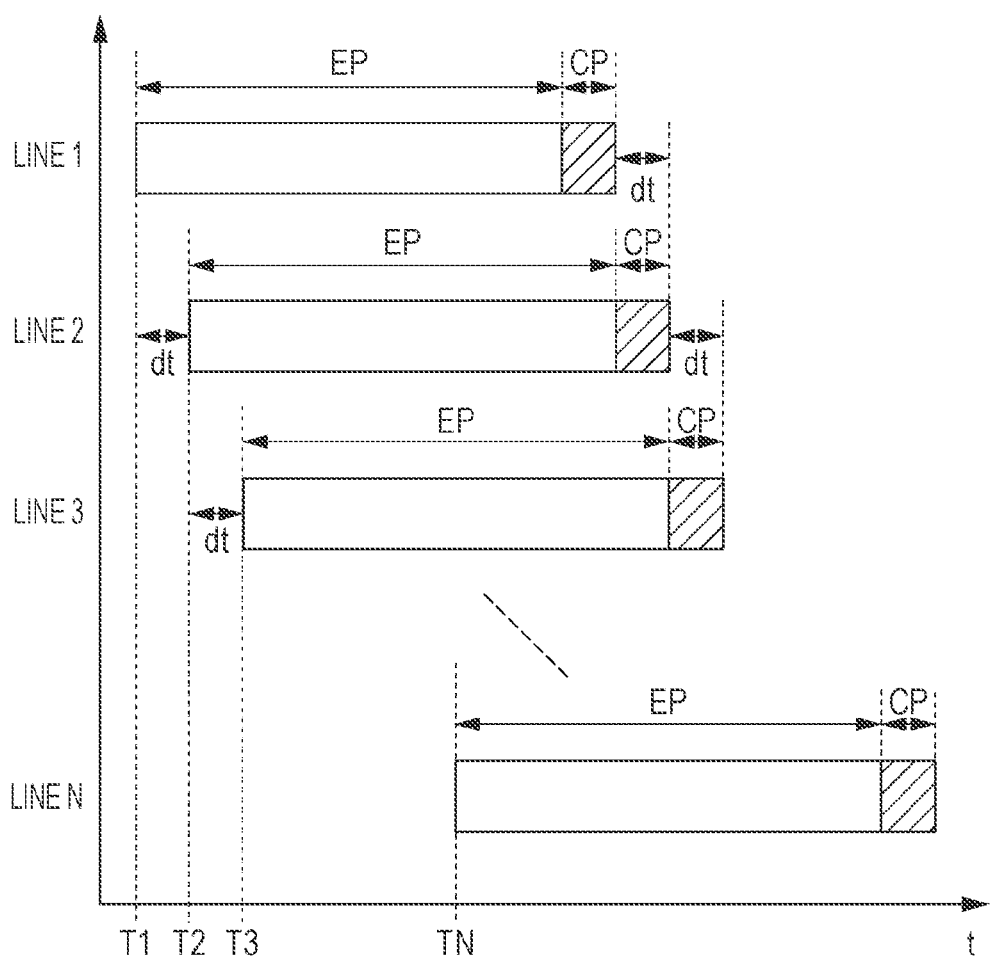
FIG. 3 is a diagram which schematically illustrates a relationship between each line in the CMOS image sensor which is the base of the present application and an exposure period of each line.

FIG. 3 is a diagram which schematically illustrates a relationship between each line in the CMOS image sensor 200 which is a base of the present application and an exposure period of each the line. In FIG. 3, a graph is illustrated in which a horizontal axis is set to a time axis, and a vertical axis is set to an axis which denotes the exposure period with respect to the pixel (light receiving unit) in each line. For example, a line 1 which is attached to the vertical axis is set to correspond to a line including pixels 211, 214, and 217 (a line in horizontal direction) which are illustrated in FIG. 2. Similarly, a line 2 which is attached to the vertical axis is set to correspond to a line including pixels 212, 215, and 218 which are illustrated in FIG. 2, and a line N which is attached to the vertical axis is set to correspond to a line including pixels 213, 216, and 219 which are illustrated in FIG. 2.

In addition, in FIG. 3, an example of an exposure period in a case in which a shutter is clicked using an electronic shutter system as an exposure method (hereinafter, referred to as focal plane shutter system) is illustrated. In addition, the focal plane shutter system is also referred to as a rolling shutter system.

As described above, since the A/D converter is shared with pixels in the vertical direction, it is necessary to delay a processing timing of an A/D conversion period (period which is necessary when A/D converter performs A/D conversion) CP at least as much as the processing timing in each line which is illustrated in FIG. 3. In addition, since an exposure period EP is constant in each line (lines 1 to N) in a general imaging mode, a temporal difference dt (A/D conversion period CP) occurs in the exposure timing in each line (lines 1 to N) in the vertical direction.

Accordingly, as illustrated in FIG. 3, it is necessary to delay exposure timing by dt between an exposure start timing T1 in line 1 and an exposure start timing T2 in line 2.

In addition, similarly, it is necessary to delay exposure timing by dt between an exposure start timing in one upper line and an exposure start timing in the subsequent line with respect to each of the subsequent lines 2 to N.

In this manner, since the focal plane shutter system is a system in which a shutter is sequentially clicked in each line, exposure timing in the upper region and the lower region in one frame is different in each line. For this reason, there is a concern that distortion may occur in a moving object. For example, when a posture of an imaging device which includes the CMOS image sensor 200 is changed during an exposure period, or when an object moves, distortion occurs in an image which is output from the CMOS image sensor 200. Examples of distortion of the output image are illustrated in FIGS. 4A to 4C.

Example of Focal Plane Distortion

Figure 4A:
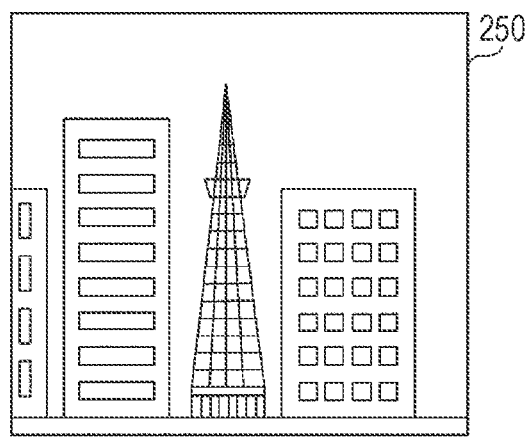
FIGS. 4A to 4C are diagrams which illustrate images generated using an imaging device including the CMOS image sensor which is the base of the present application, and a correction example thereof.
Figure 4B:
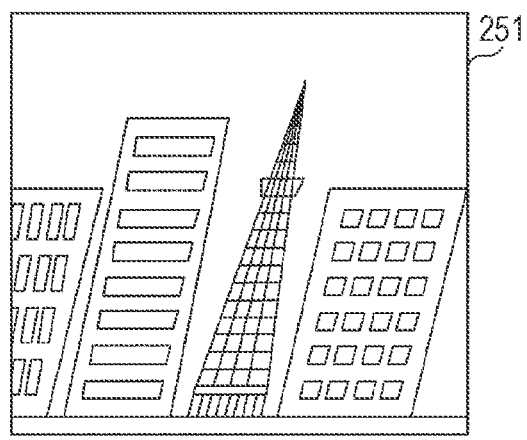
Figure 4C:
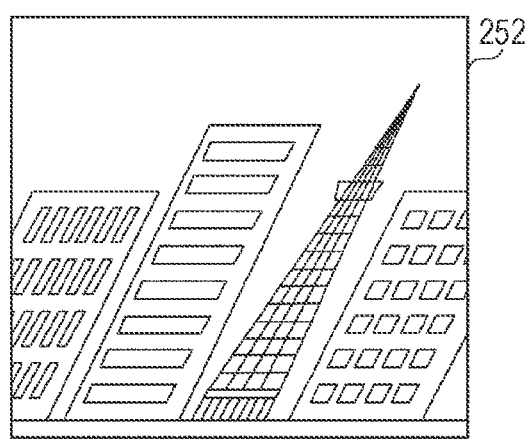

FIGS. 4A to 4C are diagrams which illustrate an image which is generated using an imaging device which includes the CMOS image sensor 200 which is the base of the present application, and a correction example thereof. In addition, in FIGS. 4A and 4B, the same object is set to an imaging target, and an example of an image in a case in which a state of the imaging device is changed is illustrated.

FIG. 4A illustrates an image 250 in a case in which the image is photographed in a state of stopping the imaging device.

FIG. 4B illustrates an image 251 in a case in which the image is photographed while moving the imaging device in the horizontal direction. In this manner, distortion (referred to as focal plane distortion) due to the focal plane shutter system occurs in the image 251 which is photographed while moving the imaging device in the horizontal direction.

Here, it is possible to generate an image with no focal plane distortion by correcting the focal plane distortion which has occurred in this manner. The correction is referred to as a correction of focal plane distortion. For example, it is possible to generate an image with no focal plane distortion (that is, approximately the same image as image 250) from the image 251 with the focal plane distortion.

Figure 5:
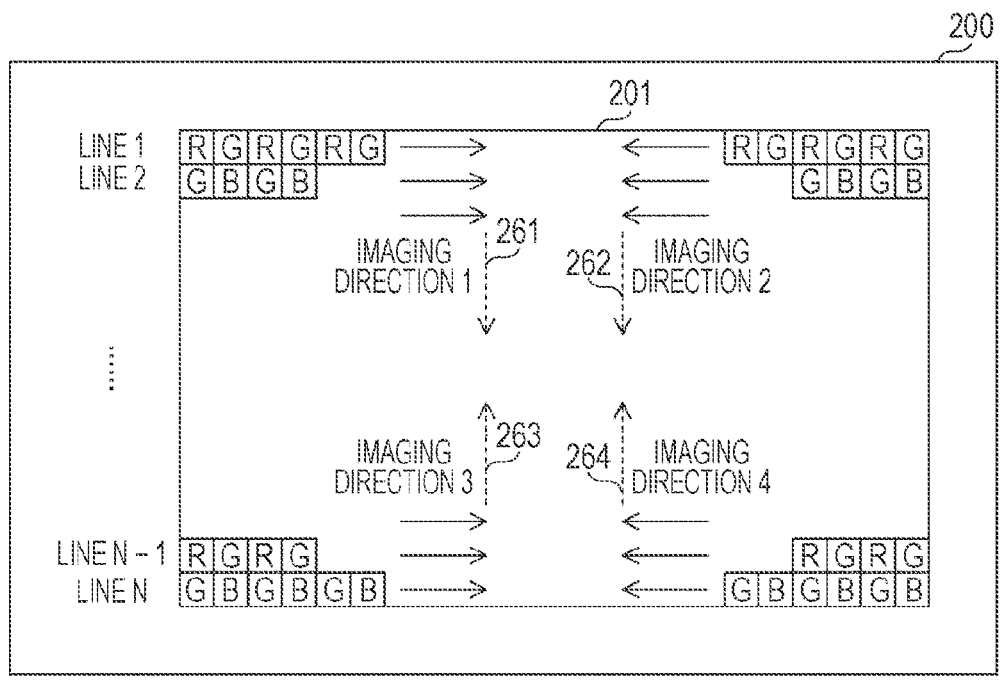
FIG. 5 is a diagram which illustrates an imaging direction of the CMOS image sensor which is the base of the present application.

However, since there are a plurality of imaging directions in the CMOS image sensor 200, it is necessary to correct focal plane distortion by taking an imaging direction into consideration. The imaging direction is illustrated in FIG. 5. In addition, FIG. 4C illustrates an example of an image (image 252) which is corrected based on a wrong imaging direction.

Example of Imaging Direction of CMOS Image Sensor

FIG. 5 is a diagram which illustrates an imaging direction of the CMOS image sensor 200 which is the base of the present application. FIG. 5 illustrates four imaging directions of 1 to 4 as the imaging direction of the CMOS image sensor 200. In addition, in FIG. 5, each pixel is denoted using a rectangle to which a mark (Red (R), Green (G), and Blue (B)) denoting a corresponding color is attached. In addition, in a pixel region 201 of the CMOS image sensor 200, only a part of pixels is denoted, and other pixels are not shown.

The imaging direction 1 is an imaging direction in which the upper left corner of the CMOS image sensor 200 which is illustrated in FIG. 5 is set to a start position of reading, and after the start position of reading, as denoted by a dotted arrow 261, reading of each line is sequentially performed in each one row so that the reading proceeds from the upper side to the lower side.

The imaging direction 2 is an imaging direction in which the upper right corner of the CMOS image sensor 200 which is illustrated in FIG. 5 is set to a start position of reading, and after the start position of reading, as denoted by a dotted arrow 262, reading of each line is sequentially performed in each one row so that the reading proceeds from the upper side to the lower side.

The imaging direction 3 is an imaging direction in which the lower left corner of the CMOS image sensor 200 which is illustrated in FIG. 5 is set to a start position of reading, and after the start position of reading, as denoted by a dotted arrow 263, reading of each line is sequentially performed in each one row so that the reading proceeds from the lower side to the upper side.

The imaging direction 4 is an imaging direction in which the lower right corner of the CMOS image sensor 200 which is illustrated in FIG. 5 is set to a start position of reading, and after the start position of reading, as denoted by a dotted arrow 264, reading of each line is sequentially performed in each one row so that the reading proceeds from the lower side to the upper side.

Here, it is necessary for a general image sensor (for example, CMOS image sensor or CCD image sensor) to flexibly correspond to an attaching position of a fixed camera, or to correspond to a posture of a hand camera. For this reason, a general image sensor is designed so that a reading direction of a pixel in the horizontal direction (hereinafter, referred to as horizontal imaging direction), and a reading direction of a pixel in the vertical direction (hereinafter, referred to as vertical imaging direction) can be changed. That is, an imaging direction of a general image sensor becomes the four imaging directions of 1 to 4 which are illustrated in FIG. 5.

Here, in a general CMOS image sensor, the vertical imaging direction in the imaging directions influences an occurrence form of focal plane distortion. As described above, since it is possible to perform imaging simultaneously using pixels in the horizontal direction, the occurrence form of focal plane distortion is not influenced when being photographed in any direction. The occurrence form of focal plane distortion will be described in detail with reference to FIGS. 6 to 7E.

Occurrence Form of Focal Plane Distortion

FIG. 6 is a diagram which illustrates a relationship among a motion of the CMOS image sensor 200 which is the base of the present application, an imaging direction of the CMOS image sensor 200, and an occurrence form of focal plane distortion.

FIGS. 7A to 7E are diagrams which illustrate an example of a form of focal plane distortion which occurs in an image which is generated by the CMOS image sensor 200 which is the base of the present application. In addition, FIGS. 7A to 7E correspond to marks of an imaged image 273 which is illustrated in FIG. 6.

Here, when a vertical imaging direction 272 illustrated in FIG. 6 is a "forward direction", it means that the vertical imaging direction in the CMOS image sensor 200 is a direction from the top to the bottom (for example, cases of imaging directions 1 and 2 illustrated in FIG. 5). In addition, when the vertical imaging direction 272 illustrated in FIG. 6 is a "backward direction", it means that the vertical imaging direction in the CMOS image sensor 200 is a direction from the bottom to the top (for example, cases of imaging directions 3 and 4 illustrated in FIG. 5).

Figures 7A, 7D, 7E:
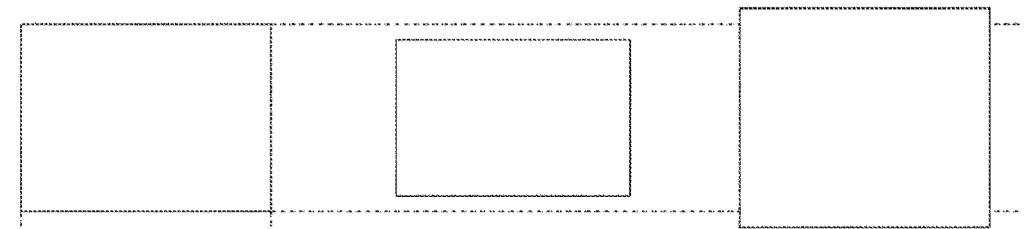
FIGS. 7A to 7E are diagrams which illustrate an example of a form of the focal plane distortion which occurs in an image generated using the CMOS image sensor which is the base of the present application.

As illustrated in FIGS. 6 to 7E, the occurrence form of focal plane distortion is different according to a combination of the motion and the imaging direction of the CMOS image sensor 200.

Specifically, FIG. 7A illustrates an image example when the CMOS image sensor 200 does not move (that is, a case in which imaging operation is performed in a state of stopped imaging device). That is, when there is no motion of the CMOS image sensor 200, focal plane distortion does not occur whatever the imaging direction of the CMOS image sensor 200 is.

Figure 7B:
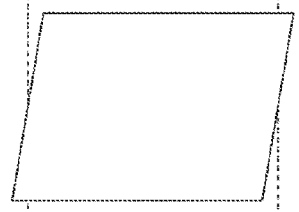
Figure 7C:
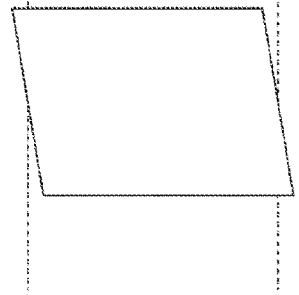

In addition, FIGS. 7B and 7C illustrate an image example when there is a motion of the CMOS image sensor 200 in the horizontal direction (that is, a case in which imaging operation is performed by panning imaging device). As illustrated in FIGS. 7B and 7C, when there is a motion of the CMOS image sensor 200 in the horizontal direction, focal plane distortion occurs since an imaging position in each line is deviated in the horizontal direction.

Here, when there is a motion of the CMOS image sensor 200 in the horizontal direction, focal plane distortion becomes different according to a direction of the motion of the CMOS image sensor 200. Specifically, a case in which the motion of the CMOS image sensor 200 in the horizontal direction is a motion from the left to the right in the horizontal direction is assumed. In this manner, when the motion of the CMOS image sensor 200 in the horizontal direction is the motion from the left to the right in the horizontal direction, and the vertical imaging direction of the CMOS image sensor 200 is the forward direction, focal plane distortion illustrated in FIG. 7B occurs. On the other hand, when the motion of the CMOS image sensor 200 in the horizontal direction is the motion from the left to the right in the horizontal direction, and the vertical imaging direction of the CMOS image sensor 200 is the backward direction, focal plane distortion illustrated in FIG. 7C occurs.

In addition, a case in which a motion of the CMOS image sensor 200 in the horizontal direction is a motion from the right to the left in the horizontal direction is assumed. In this manner, when the motion of the CMOS image sensor 200 in the horizontal direction is the motion from the right to the left in the horizontal direction, and the vertical imaging direction of the CMOS image sensor 200 is the forward direction, focal plane distortion illustrated in FIG. 7C occurs. On the other hand, when the motion of the CMOS image sensor 200 in the horizontal direction is the motion from the right to the left in the horizontal direction, and the vertical imaging direction of the CMOS image sensor 200 is the backward direction, focal plane distortion illustrated in FIG. 7B occurs.

In this manner, the relationship between the motion of the CMOS image sensor 200 and focal plane distortion is reversed depending on whether the vertical imaging direction is the forward direction or the backward direction.

In addition, FIGS. 7D and 7E illustrate image examples in a case in which there is a motion of the CMOS image sensor 200 in the vertical direction (that is, a case in which imaging operation is performed by tilting imaging device). As illustrated in FIGS. 7D and 7E, when there is a motion of the CMOS image sensor 200 in the vertical direction, focal plane distortion occurs due to deviation of an imaging position in each line in the vertical direction.

In addition, similarly to the case in which there is the motion of the CMOS image sensor 200 in the vertical direction, a relationship between the motion of the CMOS image sensor 200 and focal plane distortion is reversed depending on whether the vertical imaging direction is the forward direction or the backward direction, as illustrated in FIG. 6.

Here, when moving image contents which are generated by the CMOS image sensor are recorded in the imaging device, there is no case in which the vertical imaging direction of the CMOS image sensor at the time of the imaging operation is recorded by being related to the moving image contents as meta information. For this reason, when the moving image contents are reproduced in another reproducing device, the reproducing device is incapable of ascertaining the vertical imaging direction of the CMOS image sensor at the time of imaging operation of the moving image contents which are reproducing targets.

In this manner, when a correction of focal plane distortion is performed with respect to moving image contents of which the vertical imaging direction of the CMOS image sensor 200 at the time of imaging operation is not known, if correction processing is performed by taking a wrong vertical imaging direction, it causes a reverse correction, and distortion increases.

For example, a case in which a correction of focal plane distortion is performed with respect to the image 251 (image including focal plane distortion) illustrated in FIG. 4B is assumed. In this case, when the correction of focal plane distortion is performed by taking a wrong vertical imaging direction, a distortion level further increases like the image 252 illustrated in FIG. 4C, and there is a concern that the correction of focal plane distortion may fail.

Therefore, according to the embodiment of the present application, a case is exemplified in which imaging information at the time of imaging operation is appropriately obtained with respect to moving image contents of which imaging information at the time of imaging operation is not known. In addition, a correction of focal plane distortion is performed in an appropriate direction using the obtained imaging information (for example, vertical imaging direction or shutter system). In this manner, it is possible to appropriately perform the correction of focal plane distortion.

Determination Example of Imaging Information

Figure 8A:
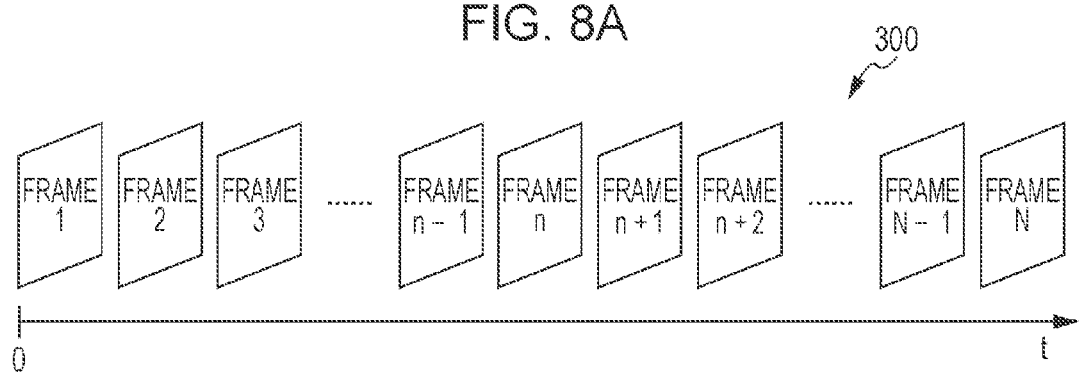
FIGS. 8A to 8C are diagrams which schematically illustrate frames configuring moving image contents which become a determination target using a determination unit according to the first embodiment of the present application.
Figure 8B:
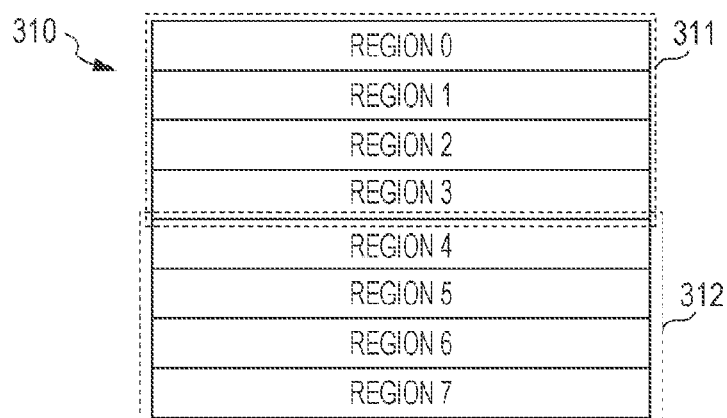
Figure 8C:
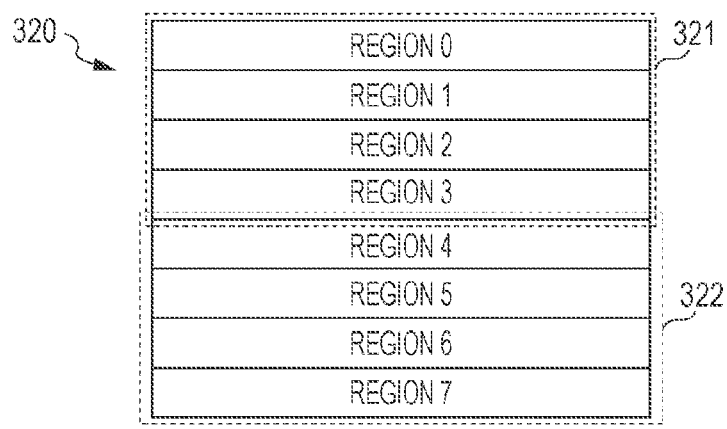

FIGS. 8A to 8C are diagrams which schematically illustrate frames which configure moving image contents 300 which are determination targets of the determination unit 120 according to the first embodiment of the present application.

FIG. 8A schematically illustrates each frame which configures the moving image contents 300 which are recorded in the moving image contents recording unit 110 in time sequence. Here, in FIG. 8A, each frame is schematically illustrated as an outlined rectangle, and is illustrated by being attached with a mark (serial number) for identifying the frame in each rectangle. For example, it is set such that a frame 1 is a top frame in each frame which configures the moving image contents 300, and frames 2 to N are set to subsequent frames from the frame 1.

In FIGS. 8B and 8C, two continuous frames among frames which configure the moving image contents 300 are illustrated. Specifically, in FIG. 8B, a frame n−1 (310) which configures the moving image contents 300 is illustrated, and in FIG. 8C, a frame n (320) which configures the moving image contents 300 is illustrated. In addition, the frame n−1 (310) illustrated in FIG. 8B corresponds to frames 1 to N−1 which configure the moving image contents 300. In addition, the frame n (320) illustrated in FIG. 8C corresponds to frames 2 to N which configure the moving image contents 300.

In addition, in FIGS. 8B and 8C, an example in which each frame (frame n−1 (310), frame n (320)) is divided into eight regions (0th region to seventh region), and a movement vector is detected from each of the regions (0th region to seventh region) is illustrated. In addition, in FIGS. 8B and 8C, an example of dividing into eight regions (0th region to seventh region) in the vertical direction as a dividing method is illustrated.

Here, a movement vector which is detected from a plurality of regions (0th region to seventh region) in each frame is a local movement vector in each frame, and is also referred to as a Local Motion vector (LMV). For this reason, hereinafter, movement vectors which are detected from the plurality of regions (0th region to seventh region) in each frame will be described as a local movement vector or a LMV.

In addition, as a method of detecting a local movement vector, for example, it is possible to use a method of obtaining a local movement vector by retrieving a position with strong correlation from a retrieving region of the previous frame with respect to a target region which becomes a detection target of the local movement vector. As the detection method, for example, it is possible to use a block matching method (for example, refer to Japanese Unexamined Patent Application Publication No. 2007-208580). The block matching method is a method which retrieves a location of an image similar to an image included in a target region which becomes a detection target of a local movement vector in the previous frame which is a comparison target, and detects the local movement vector of the target region based on a retrieving result thereof. Specifically, the local movement vector is detected by setting a searching range to a magnitude of the greatest quantity of motion which is assumed with respect to the plurality of regions (blocks) in the target region, and performing retrieval in the set search range.

In addition, another detection method may be used. For example, it is possible to use a detection method in which the local movement vector is detected using a numeric calculation, using a method such as an optical flow.

In addition, in the frame n−1 (310), regions on the upper side (0th region to third region) are denoted by being surrounded with a rectangular dotted line as the upper region 311, and regions on the lower side (fourth region to seventh region) are denoted by being surrounded with a rectangular dotted line as the lower region 312. Similarly, in the frame n (320), regions on the upper side (0th region to third region) are denoted by being surrounded with a rectangular dotted line as the upper region 321, and regions on the lower side (fourth region to seventh region) are denoted by being surrounded with a rectangular dotted line as the lower region 322. In addition, the upper region 311, the lower region 312, the upper region 321, and the lower region 322 will be described in detail with reference to FIGS. 9A and 9B.

In this manner, the determination unit 120 obtains a feature amount (local movement vector) in each of the plurality of regions based on a comparison result between a plurality of regions in a target frame (current frame) which configures moving image contents and another frame (previous frame to current frame).

In addition, according to the first embodiment of the present application, an example in which one frame is divided into eight regions, and local movement vectors are detected has been described, however, movement vectors which are detected with respect to regions divided using another dividing method may be used.

FIGS. 9A and 9B are diagrams which illustrate a relationship between a quantity of motion corresponding to a local movement vector which is detected by the determination unit 120 according to the first embodiment of the present application and a region in a frame. In addition, in FIGS. 9A and 9B, an example of a case in which a moving body is not included in a frame is illustrated.

In FIGS. 9A and 9B, respective regions (eight regions for detecting local movement vector) of each frame (for example, frames n−1 to n+2) are denoted side by side in a frame unit on a horizontal axis. In addition, a value (quantity of motion) corresponding to the local movement vector which is detected in each region is denoted on a vertical axis. In addition, it is set such that the frames n−1 to n+2 correspond to the frames n−1 to n+2 which are illustrated in FIG. 8A.

For example, a case in which an imaging operation is performed using an imaging device which generates moving image contents which are recorded in the moving image contents recording unit 110 is assumed. Here, it is set such that the imaging operation is performed while moving the imaging device in the horizontal direction. In this case, since exposure timing in the vertical direction becomes different when a moving speed in the horizontal direction is different, it is assumed that a movement vector of each region in the same frame becomes different.

For example, FIG. 9A illustrates a relationship between a region in each frame and a quantity of motion corresponding to a local movement vector detected from each region when the imaging operation is performed by moving the imaging device in the horizontal direction while changing a moving speed.

As described above, since exposure timing in the vertical direction is deviated, a quantity of motion corresponding to a movement vector which is detected from each region is changed according to the change in the moving speed. In addition, a change in the quantity of motion corresponding to the movement vector which is detected from a region corresponding to a boundary between frames becomes different depending on a vertical imaging direction in the CMOS image sensor.

For example, a case in which the vertical imaging direction in the CMOS image sensor is the forward direction is assumed. In this case, when a quantity of motion (speed, difference from the previous frame) corresponding to a local movement vector which is detected from each region is arranged in each region, a change in the quantity of motion becomes smooth, as illustrated in FIG. 9A. In addition, a change in the quantity of motion at a boundary of each frame also becomes smooth. That is, it is possible to denote the change in the quantity of motion using a curve 330.

On the other hand, a case in which the vertical imaging direction in the CMOS image sensor is the backward direction is assumed. In this case, when the quantity of motion (speed, difference from the previous frame) corresponding to a local movement vector which is detected from each region is arranged in each region, the change in the quantity of motion in each frame becomes smooth as illustrated in FIG. 9B, however, the quantity of motion at the boundary of each frame rapidly changes. In addition, as illustrated in FIG. 9B, the change in a quantity of motion between each of frames becomes opposite to the example illustrated in FIG. 9A.

In this manner, the change in the quantity of motion in each frame becomes opposite in a case in which the vertical imaging direction is the forward direction, and in a case in which the vertical imaging direction is the backward direction, and the change in the quantity of motion at the boundary of each frame becomes different. Therefore, according to the first embodiment of the present application, an example is described in which whether the vertical imaging direction is the forward direction or the backward direction is determined by making use of these properties.

Calculation Example of Local Movement Vector

First, the determination unit 120 sets one frame among frames which configure the moving image contents 300 to the current frame (target frame). Subsequently, the determination unit 120 divides the current frame into eight regions, and detects a local movement vector in each of the regions. For example, a case in which nth frame n (frame n (320) illustrated in FIG. 8C) among frames which configure the moving image contents 300 is set to the current frame (target frame) is assumed. In this case, the determination unit 120 detects local movement vectors with respect to regions 0 to 7 in the frame n (320).

Calculation Example of Quantity of Motion of Forward Direction Frame Boundary and Quantity of Motion of Backward Direction Frame Boundary Subsequently, the determination unit 120 calculates a quantity of motion of a forward direction frame boundary and a quantity of motion of a backward direction frame boundary with respect to the frame n (320). For example, the determination unit 120 calculates the quantity of motion of the forward direction frame boundary (NormalFrameDiff$_n$) using the following formula 1, and calculates the quantity of motion of the backward direction frame boundary (InverseFrameDiff$_n$) using the following formula 2. In addition, the suffix n is a serial number for identifying each frame.

$$NormalFrameDiff_n = \left| \sum_{i=0}^{3} LMV[i]_n - \sum_{i=4}^{7} LMV[i]_{n-1} \right| \quad (1)$$

$$InverseFrameDiff_n = \left| \sum_{i=4}^{7} LMV[i]_n - \sum_{i=0}^{3} LMV[i]_{n-1} \right| \quad (2)$$

Here, the first section of the formula 1 denotes a total sum of a quantity of motion of LMVs of the upper region 321 in an image of the current frame (target frame). That is, the first section denotes a total sum of a quantity of motion of the LMVs of respective regions of 0 to 3 (region surrounded with rectangle (upper region 321)) which are illustrated in FIG. 8C. In addition, the second section of the formula 1 denotes a total sum of a quantity of motion of LMVs in the lower region 312 in an image in the previous frame (frame n−1) to the current frame. That is, the second section denotes a total sum of a quantity of motion of LMVs of respective regions of 4 to 7 (region surrounded with rectangle (lower region 312)) which are illustrated in FIG. 8B.

In addition, the quantity of motion of the forward direction frame boundary (NormalFrameDiff$_n$) which is calculated using the formula 1 denotes an amount of change of a movement vector at a frame boundary portion when the vertical imaging direction is the forward direction.

In addition, the first section of the formula 2 denotes a total sum of a movement vector of LMVs of the lower region 322 in an image of the current frame (target frame). That is, the first section denotes a total sum of a quantity of motion of the LMVs of respective regions of 4 to 7 (region surrounded with rectangle (lower region 322)) which are illustrated in FIG. 8C. In addition, the second section of the formula 2 denotes a total sum of a quantity of motion of LMVs in the upper region 311 in an image in the previous frame (frame n−1) to the current frame. That is, the second section denotes a total sum of a quantity of motion of LMVs of respective regions of 0 to 3 (region surrounded with rectangle (upper region 311)) which are illustrated in FIG. 8B.

In addition, the quantity of motion of the backward direction frame boundary (InverseFrameDiff$_n$) which is calculated using the formula 2 denotes an amount of change of a movement vector at a frame boundary portion when the vertical imaging direction is the backward direction.

Subsequently, the determination unit 120 similarly calculates the quantity of motion of the forward direction frame boundary (NormalFrameDiff$_n$) and the quantity of motion of the backward direction frame boundary (InverseFrameDiff$_n$) with respect to each frame after the n+1th frame n+1.

In addition, in the example, an example is described in which the quantity of motion of a forward direction frame boundary and the quantity of motion of a backward direction frame boundary are calculated using all of the LMVs in each region of the upper region, and all of the LMVs in each region of the lower region in the image in each frame. However, the quantity of motion of the forward direction frame boundary and the quantity of motion of the backward direction frame boundary may be calculated using only a part of the LMVs in each region of the upper region and the LMVs in each region of the lower region in the image in each frame. For example, the quantity of motion of the forward direction frame boundary, and the quantity of motion of the backward direction frame boundary may be calculated using the LMVs of a part of the regions in the upper part (for example, regions 0 and 1), and the LMVs of a part of the regions in the lower part (for example, regions 6 and 7) in the image in each frame. In addition, the quantity of motion of the forward direction frame boundary, and the quantity of motion of the backward direction frame boundary may be calculated using the LMV of one region in the upper part (for example, region 0), and the LMV of one region in the lower part (for example, region 7) in the image in each frame.

In addition, hitherto, an example in which movement vectors which are detected from eight regions (0th region to seventh region) in the vertical direction (y direction) of a frame are used has been described, for ease of description. However, in the above described block matching method, in general, a frame is divided into a matrix, and a local movement vector is obtained from a two-dimensional division region. For this reason, the two-dimensional movement vector may be used. For example, a case is assumed in which one frame is divided into 64 regions to have 8 regions in the horizontal direction (x direction) and 8 regions in the vertical direction (y direction), and movement vectors which are detected from each of the regions are used. In this case, for example, a total sum of moving quantities of LMVs of 32 regions (8(x direction)×4(y direction)) corresponding to the upper region in the image of the current frame (frame n) is obtained in the first section of the formula 1. In addition, similarly, a total sum of moving quantities of LMVs of 32 (8(x direction)×4(y direction)) regions is obtained with respect to each of other sections (second section of formula 1, first and second sections of formula 2). In addition, the quantity of motion of the forward direction frame boundary and quantity of motion of the backward direction frame boundary are calculated using each value of these.

In addition, the first section of the formula 1 may be calculated by being limited to an effective LMV. That is, a mean value of LMVs may be obtained by being divided by the number of LMVs (number of effective LMVs) which are a calculation target, and the mean value of the LMVs may be used instead of the value of the first section of the formula 1. For example, when one frame is divided into 64 (8(x direction)×8(y direction)) regions, a mean value of LMVs is obtained by dividing a value which is obtained by the first section of formula 1 by the number of effective LMVs (maximum 32 (8(number of LMVs in x direction)×4(number of LMVs in y direction))). In addition, the mean value of the LMVs is used instead of the value in the first section of formula 1. Here, an ineffective LMV is subject to a value of 0. In addition, when no effective LMVs are present in the target region, the value of the first section of formula 1 is set to 0. In addition, similarly, a value of each section in other sections (second section in formula 1, first and second sections in formula 2) is also calculated by being limited to effective LMVs. In this manner, when calculating the quantity of motion of the forward direction frame boundary and quantity of motion of the backward direction frame boundary, the quantities can be calculated by being limited to effective LMVs.

In this manner, it is possible to improve determination precision of imaging information by calculating the quantity of motion of the forward direction frame boundary and the quantity of motion of the backward direction frame boundary, by being limited to effective LMVs.

In addition, in the example, a case in which eight movement vectors are obtained and used in one frame period has been exemplified, however, as described above, two or more movement vectors (for example, movement vectors of 2 to 7, or 9 or more) may be obtained and used in one frame period.

Calculation Example of Integration Value of Quantity of Motion of the Forward Direction Frame Boundary, and Integration Value of Quantity of Motion of the Backward Direction Frame Boundary Here, a case is assumed in which hand shake occurs in an imaging operation using a general CMOS image sensor. For example, when a vertical imaging direction of the CMOS image sensor in the imaging operation is the forward direction, an LMV which becomes a curve 330 illustrated in FIG. 9A (LMV Index=0 to 7) is obtained in each frame. On the other hand, when the vertical imaging direction of the CMOS image sensor in the imaging operation is the backward direction, an LMV illustrated in FIG. 9B (LMV Index=0 to 7) is obtained in each frame.

Therefore, an amount of change of a movement vector at a frame boundary portion is calculated in order to determine a case in which the vertical imaging direction is the forward direction, and a case in which the vertical imaging direction is the backward direction.

That is, the determination unit 120 integrates (adds) the respective calculated quantity of motion of the forward direction frame boundary (NormalFrameDiff$_n$) and quantity of motion of the backward direction frame boundary (InverseFrameDiff$_n$). Specifically, the determination unit 120 calculates an integration value of quantity of motion of the forward direction frame boundary (NormalDiffSum) by integrating (adding) the quantity of motion of the forward direction frame boundary (NormalFrameDiff$_n$) using the following formula 3. In addition, the determination unit 120 calculates an integration value of quantity of motion of the backward direction frame boundary (InverseDiffSum) by integrating (adding) the quantity of motion of the backward direction frame boundary (InverseFrameDiff$_n$) using the following formula 4.

$$NormalDiffSum = \sum_{n=1}^{N} NormalFrameDiff_n \quad (3)$$

$$InverseDiffSum = \sum_{n=1}^{N} InverseFrameDiff_n \quad (4)$$

Here, N is a value denoting the number of frames (integer of 1 or more) which configure moving image contents.

Another Calculation Example of Integration Value of Quantity of Motion of the Forward Direction Frame Boundary, and Integration Value of Quantity of Motion of the Backward Direction Frame Boundary Formulas 3 and 4 are formulas which are used when calculating an integration value of all of frames (first frame to last frame) which configure moving image contents. However, since there is no previous frame to the first frame among frames which configure the moving image contents, it is also assumed that a local movement vector is not detected. In this manner, when a local movement vector is not detected in the first frame, it is not possible to perform a calculation of the second section in formula 1 and formula 2, respectively. Therefore, the integration value of quantity of motion of the forward direction frame boundary (NormalDiffSum) may be calculated using the following formula 5, and the integration value of quantity of motion of the backward direction frame boundary (InverseDiffSum) may be calculated using the following formula 6. However, in formulas 5 and 6, N is set to an integer of 2 or more.

$$NormalDiffSum = \sum_{n=2}^{N} NormalFrameDiff_n \quad (5)$$

$$InverseDiffSum = \sum_{n=2}^{N} InverseFrameDiff_n \quad (6)$$

Determination Example of Vertical Imaging Direction

Subsequently, the determination unit 120 determines the vertical imaging direction by comparing the calculated integration value of quantity of motion of the forward direction frame boundary (NormalDiffSum) and an integration value of quantity of motion of the backward direction frame boundary (InverseDiffSum) with each other.

As described above, a direction in which an amount of change of a local movement vector of the frame boundary portion is smoothly connected is considered to be an actual imaging direction. Therefore, it is possible to determine that the direction of being smoothly connected is the actual imaging direction by comparing the integration value of quantity of motion of the forward direction frame boundary (NormalDiffSum) and the integration value of quantity of motion of the backward direction frame boundary (InverseDiffSum) with each other.

Specifically, the determination unit 120 determines whether or not the integration value of quantity of motion of the forward direction frame boundary (NormalDiffSum) is smaller than the integration value of quantity of motion of the backward direction frame boundary (InverseDiffSum). In addition, the determination unit 120 determines that the vertical imaging direction is the forward direction when the integration value of quantity of motion of the forward direction frame boundary (NormalDiffSum) is smaller than the integration value of quantity of motion of the backward direction frame boundary (InverseDiffSum). On the other hand, the determination unit 120 determines that the vertical imaging direction is the backward direction when the integration value of quantity of motion of the forward direction frame boundary (NormalDiffSum) is equal to or greater than the integration value of quantity of motion of the backward direction frame boundary (InverseDiffSum).

That is, the determination unit 120 makes the determination using the following determination condition (formula 7), and can obtain the vertical imaging direction as the imaging information.

$$\text{Imaging Information} = \begin{cases} \text{Vertical imaging forward direction} & \text{Normal } \textit{Diff} \text{ Sum} < \text{Inverse } \textit{Diff} \text{ Sum} \\ \text{Vetical imaging backward direction} & \text{Otherwise} \end{cases} \quad (7)$$

In this manner, it is possible to determine the vertical imaging direction by integrating amounts of change of movement vectors at the frame boundary portion when the vertical imaging direction is the forward direction, and when the vertical imaging direction is the backward direction, and by comparing the amounts of change with each other.

Determination Example of Moving Image Contents of Global Shutter System

It is possible to determine the vertical imaging direction of an image sensor at the time of imaging operation with respect to moving image contents of which occurrence of focal plane distortion is known using the above described determination method. In addition, it is possible to appropriately perform a correction of focal plane distortion based on the determination result (vertical imaging direction).

However, for example, moving image contents which are imaged using the image sensor (for example, CCD image sensor) of the global shutter system do not have focal plane distortion in principle. For this reason, it is not necessary to perform a correction of focal plane distortion with respect to moving image contents which are imaged using a global shutter image sensor.

In this manner, there is a case in which a correction of focal plane distortion is necessary, and a case in which the correction of focal plane distortion is not necessary according to a shutter system of an image sensor. Therefore, in order to correspond to moving image contents which are generated by the global shutter image sensor (for example, CCD image sensor), it is preferable to determine whether the shutter system is the global shutter system or the focal plane shutter system.

Therefore, in a case of not knowing the imaging information at the time of imaging operation of moving image contents, a determination of the shutter system (global shutter system, focal plane shutter system) is performed along with a determination of the vertical imaging direction (forward direction, backward direction). In addition, the correction processing is performed based on the determination result.

Figure 10:
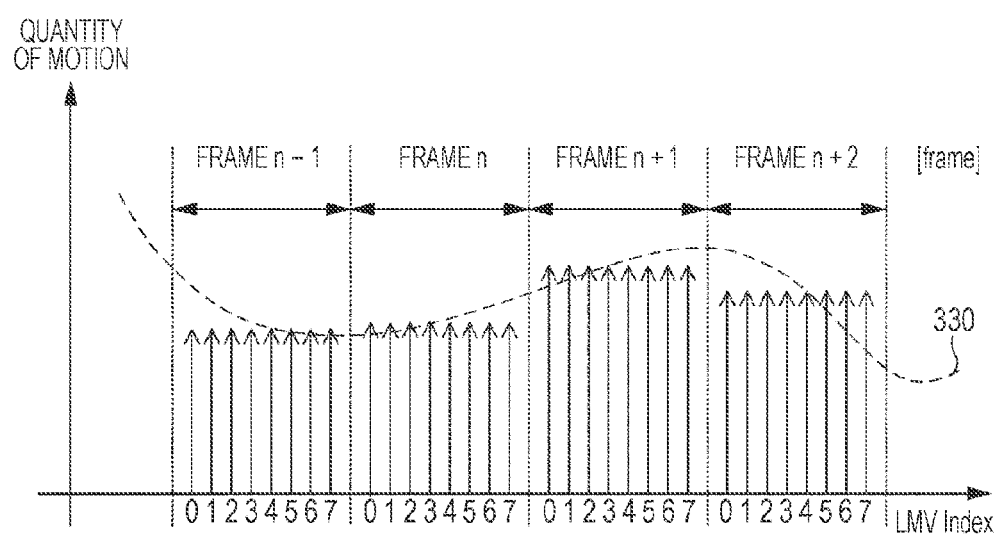
FIG. 10 is a diagram which illustrates a relationship between the quantity of motion corresponding to the local movement vector which is detected by the determination unit according to the first embodiment of the present application and the region in the frame.

FIG. 10 is a diagram which illustrates a relationship between a quantity of motion corresponding to a local movement vector which is detected by the determination unit 120 according to the first embodiment of the present application and a region in a frame. In addition, a graph illustrated in FIG. 10 corresponds to the graphs illustrated in FIGS. 9A and 9B. In addition, FIG. 10 illustrates an example of a relationship between a quantity of motion corresponding to a local movement vector which is detected with respect to the moving image contents generated by the global shutter image sensor (for example, CCD image sensor) and a region in a frame. In addition, FIG. 10 illustrates an example of a case in which there is no moving body in the frame, similarly to FIGS. 9A and 9B.

As illustrated in FIGS. 9A and 9B, in an imaging operation using a general CMOS image sensor, local movement vectors (LMV Index=0 to 7) which are detected in each region in a frame are reversed in the same frame depending on the vertical imaging direction. In contrast to this, in an imaging operation using the global shutter image sensor, a local movement vector is approximately constant in the same frame as illustrated in FIG. 10, when there is no moving body in the frame.

For this reason, moving image contents which are generated by the global shutter image sensor have a small difference between the integration value of quantity of motion of the forward direction frame boundary (NormalDiffSum) and the integration value of quantity of motion of the backward direction frame boundary (InverseDiffSum). For example, the difference is equal to or smaller than a threshold value. Therefore, the determination unit 120 makes a determination on whether the shutter system is the global shutter system or the focal plane shutter system (rolling shutter system) using the following conditional expression (formula 8).

$$\text{Imaging Information} = \begin{cases} \text{Global Shutter} & |\text{Normal } \textit{Diff } \text{Sum} - \text{Inverse } \textit{Diff } \text{Sum}| \\ & \leq \text{thresh} \\ \text{Rolling Shutter Vertical imaging forward direction} & |\text{Normal } \textit{Diff } \text{Sum} - \text{Inverse } \textit{Diff } \text{Sum}| \\ & \leq \text{thresh} \\ & \text{AND Normal } \textit{Diff } \text{Sum} < \text{Inverse } \textit{Diff } \text{Sum} \\ \text{Rolling Shutter Vertical imaging backward direction} & \text{Otherwise} \end{cases} \quad (8)$$

Here, "thresh" is a threshold value. As the threshold value, for example, a value which is suitable for making a determination of whether the shutter system is the global shutter system or the focal plane shutter system is set. In addition, the threshold value is changed according to a determination period of imaging information of moving image contents.

In addition, since the above described threshold value is set to be unchangeable regardless of the determination period of the imaging information of the moving image contents, the determination may be made based on a value which is normalized in the determination period of the imaging information of the moving image contents. That is, the determination of whether the shutter system is the global shutter system or the focal plane shutter system may be made using the following conditional expression (formula 9).

$$\text{Imaging Information} = \begin{cases} \text{Global Shutter} & |\text{Normal } \textit{Diff } \text{Ave} - \text{Inverse } \textit{Diff } \text{Ave}| \\ & \leq \text{thresh} \\ \text{Rolling Shutter Vertical imaging forward direction} & |\text{Normal } \textit{Diff } \text{Ave} - \text{Inverse } \textit{Diff } \text{Ave}| \\ & \leq \text{thresh} \\ & \text{AND Normal } \textit{Diff } \text{Ave} < \text{Inverse } \textit{Diff } \text{Ave} \\ \text{Rolling Shutter Vertical imaging backward direction} & \text{Otherwise} \end{cases} \quad (9)$$

Here, NormalDiffAve is a value in which the integration value of quantity of motion of the forward direction frame boundary (NormalDiffSum) is normalized in a determination period of imaging information. In addition, InverseDiffAve is a value in which the integration value of quantity of motion of the backward direction frame boundary (InverseDiffSum) is normalized in the determination period of the imaging information.

In addition, these normalized values (NormalDiffAve, InverseDiffAve) can be obtained by averaging each integration value using the number of times of addition of each integration value (NormalDiffSum, InverseDiffSum). That is, the normalized values can be obtained by averaging (for example, dividing each integration value by the number of times) each integration value using the number of times of updating each integration value (NormalDiffSum, InverseDiffSum).

Here, when it is determined that photographing was performed using the global shutter system as a result of determining the shutter system, the correction unit 130 outputs moving image contents as a corrected image without performing correction processing with respect to the moving image contents.

In this manner, it is possible to accurately determine the shutter system of the moving image contents of which imaging information at the time of imaging operation is not known. That is, it is possible to determine that moving image contents of which imaging information is not known at the time of imaging operation are moving image contents which are imaged using the global shutter image sensor. In this manner, it is possible to prevent unnecessary correction of focal plane distortion from being performed with respect to moving image contents which are imaged using the global shutter image sensor (moving image contents of which imaging operation is performed in an environment which has no focal plane distortion in principle). That is, it is possible to confirm whether or not the correction of moving image contents is necessary based on a determination result, by determining a shutter system.

In this manner, the determination unit 120 can determine imaging information at the time of imaging operation of the moving image contents based on continuity of local movement vectors between frames which are neighboring time sequentially among frames which configure the moving image contents.

In addition, for example, the frames which are neighboring time sequentially among the frames which configure the moving image contents are set to a first frame and a second frame. In this case, the determination unit 120 performs determination based on a comparison result of a local movement vector which is obtained from a region on one end side in a specific direction of the first frame, and a local movement vector which is obtained from a region on the other end side in a specific direction of the second frame. Here, the specific direction of each frame can be set to a vertical direction of each frame, for example.

In addition, for example, the local movement vector which is obtained from the region on one end side of the first frame is set to a first movement vector, and the local movement vector which is obtained from the region on the other end side of the first frame is set to a second movement vector. In addition, a local movement vector which is obtained from a region on one end side of the second frame is set to a third movement vector, and a local movement vector which is obtained from a region on the other end side of the second frame is set to a fourth movement vector. In this case, the determination unit 120 makes a determination using a value which is calculated based on a comparison result of the first movement vector and the fourth movement vector, and a comparison result of the second movement vector and the third movement vector (for example, value calculated using formulas 3 and 4, or formulas 5 and 6).

In addition, in the embodiment of the present application, an example in which an image which is cut out from moving image contents is set to a frame image has been described, however, it is possible to apply the embodiment of the present application to a case in which an image which is cut out from moving image contents is set to a field image.

Correction Example of Focal Plane Distortion

Figure 11:
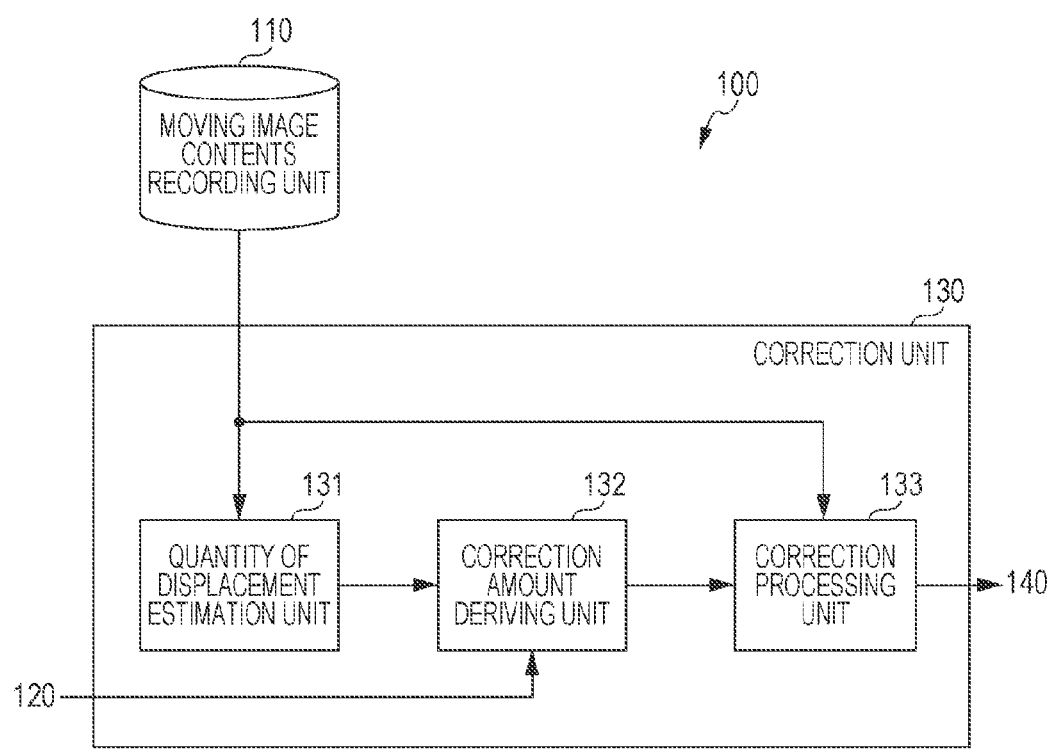
FIG. 11 is a block diagram which illustrates a functional configuration example of a correction unit according to the first embodiment of the present application.

FIG. 11 is a block diagram which illustrates a functional configuration example of the correction unit 130 according to the first embodiment of the present application.

The correction unit 130 performs appropriate correction processing of focal plane distortion using imaging information which is determined by the determination unit 120. Specifically, the correction unit 130 includes a quantity of displacement estimation unit 131, a correction amount deriving unit 132, and a correction processing unit 133.

The quantity of displacement estimation unit 131 estimates a quantity of displacement of moving image contents which are recorded in the moving image contents recording unit 110, and outputs the estimated quantity of displacement to the correction amount deriving unit 132. In addition, a method of estimating a quantity of displacement will be described in detail with reference to FIGS. 12A to 13D.

The correction amount deriving unit 132 derives a correction amount for correcting moving image contents which are recorded in the moving image contents recording unit 110 based on a quantity of displacement which is estimated by the quantity of displacement estimation unit 131 (estimated quantity of displacement) and a determination result using the determination unit 120 (imaging information). In addition, the correction amount deriving unit 132 outputs the derived correction amount to the correction processing unit 133. In addition, a method of deriving a correction amount will be described in detail with reference to FIGS. 14A to 14C.

The correction processing unit 133 corrects moving image contents which are recorded in the moving image contents recording unit 110 based on a correction amount which is derived from the correction amount deriving unit 132, and outputs corrected moving image contents to the output unit 140. In addition, the correction method will be described in detail with reference to FIGS. 12A to 14C.

FIGS. 12A to 14C are diagrams which illustrate a relationship among an image which is a target of correction processing using the correction unit 130 according to the first embodiment of the present application and a corrected image, and each piece of information which is used in the correction processing.

FIGS. 12A to 13D illustrate graphs in which a vertical axis is set to an axis which denotes each frame in time sequence, and a horizontal axis is set to an axis which denotes each information related to each frame. In addition, marks (n−2 to n+3) for specifying frames are denoted on the right side in respective FIGS. 12A to 13D.

In FIG. 12A, a graph which time sequentially denotes a hand shake quantity in the horizontal direction of an image sensor is illustrated. In FIG. 12B, an example of an image which is generated when there is the hand shake quantity illustrated in FIG. 12A is illustrated.

In FIG. 12C, an example of a quantity of displacement which is estimated with respect to the image which is illustrated in FIG. 12B (quantity of displacement of image sensor at time of imaging operation) is illustrated.

In FIG. 12D, an example of a correction amount which is derived based on a quantity of displacement (quantity of displacement of image sensor at time of imaging operation) which is illustrated in FIG. 12C, and a determination result using the determination unit 120 is illustrated.

In FIG. 12E, an example of a corrected image when the image illustrated in FIG. 12B is corrected based on the correction amount illustrated in FIG. 12D is illustrated.

For example, a case in which there is hand shake of the hand shake amount illustrated in FIG. 12A (hand shake in the horizontal direction), and the imaging information illustrated in FIG. 12B is generated is assumed. In addition, a relationship among a motion of the CMOS image sensor, the vertical imaging direction, and the imaged image is the same as that illustrated in FIG. 6.

Here, the hand shake illustrated in FIG. 12A is a non-linear motion. In this manner, when the hand shake is the non-linear motion, non-linear distortion also occurs in the imaged image, as illustrated in FIG. 12B.

Estimation Example of Quantity of Displacement

Here, in FIG. 12A, the hand shake amount of the image sensor in the horizontal direction is time sequentially denoted, however, in an actual system, it is difficult to obtain information on a hand shake amount in each line from moving image contents, in general. For this reason, it is necessary to estimate a quantity of displacement of the image sensor at a time of imaging operation of an imaged image, based on the imaged image.

For example, the quantity of displacement estimation unit 131 derives an estimated quantity of displacement (estimated quantity of displacement of image sensor at time of imaging operation) which is illustrated in FIG. 12C based on the imaged image illustrated in FIG. 12B. The estimated quantity of displacement is a value which is calculated based on estimation on how much the image sensor has moved in one frame period. In addition, an example of deriving one estimated quantity of displacement in one frame period is illustrated in FIG. 12C, however, a plurality of estimated quantities of displacement may be derived in one frame period.

Here, an estimation method of a quantity of displacement of the image sensor at the time of imaging operation using the quantity of displacement estimation unit 131 will be described with reference to FIGS. 13A to 13D. In addition, in the example illustrated in FIGS. 13A to 13D, for ease of description, an example is illustrated in which LMVs are calculated from four regions with respect to each frame, and an estimated quantity of displacement is calculated based on the LMVs.

The imaged image which is illustrated in FIG. 13A corresponds to the imaged image which is illustrated in FIG. 12B. In addition, it is set such that the LMVs which are illustrated in FIG. 13B (LMV Index=0 to 3) are obtained in each frame with respect to the imaged image which is illustrated in FIG. 13A.

Here, as a method of estimating a quantity of displacement of an image sensor, for example, it is possible to use a method in which a Global Motion Vector (GMV) which is calculated based on an LMV is set to an estimation amount. This estimation method is the simplest method, and it is possible to obtain Estimated Displacement in Horizontal direction (EDH) as illustrated in the following formula 10. In addition, the suffix n is a serial number for identifying each frame.

$$EDH_n = GMV_n = \frac{\sum_{i=0}^{3} LMV[i]_n}{4} \quad (10)$$

In FIG. 13C, an example of estimated quantity of displacement obtained using formula 10 is illustrated.

Here, the LMV is calculated based on a difference between position coordinates of the current frame (for example, nth frame) and position coordinates of the previous frame (for example, n−1th frame) with respect to a certain reference image. For this reason, the LMV in the current frame is a quantity of displacement in a period from the previous frame to the current frame. In contrast to this, distortion of the imaged image in the current frame occurs based on the quantity of displacement of the current frame.

For this reason, as described above, when the GMV is set to the estimated quantity of displacement of the image sensor, there is a case in which a phase shift between the LMV and a waveform of hand shake occurs.

For example, in the imaged image of the nth frame, and in the imaged image of the n−1th frame illustrated in FIG. 13A, distortion occurs at the same angle from the upper left to the lower right. However, as illustrated in FIG. 13C, there is a large difference in the estimated quantity of displacement which is obtained based on the GMV between the nth frame and the n−1th frame.

Therefore, in order to alleviate such a phase shift, the estimated quantity of displacement (EDH) may be obtained using the following formula 11.

$$EDH_n = \frac{\left(\sum_{i=0}^{3} LMV[i]_n + \sum_{i=0}^{3} LMV[i]_{n+1}\right)}{8} \quad (11)$$

That is, it is possible to obtain the estimated quantity of displacement of the current frame based on all of LMVs of the subsequent frame to the current frame (for example, n+1th frame), and all of LMVs of the current frame (for example, nth frame). In this manner, it is possible to alleviate the phase shift.

In FIG. 13D, an example of an estimated quantity of displacement which is obtained using formula 11 is illustrated.

In addition, it may be possible to obtain a quantity of estimation using a center of a difference, using only the LMVs which are included in a target frame period. For example, the estimated quantity of displacement (EDH) may be obtained using the following formula 12.

$$EDH_n = \frac{\left(\sum_{i=2}^{3} LMV[i]_n + \sum_{i=0}^{1} LMV[i]_{n+1}\right)}{4} \quad (12)$$

Example of Deriving Correction Amount

The correction amount deriving unit 132 derives a correction amount in each line in each frame period illustrated in FIG. 12D based on an estimated quantity of displacement of the image sensor illustrated in FIG. 12C, and the imaging information which is output from the determination unit 120.

Here, a method of deriving a correction amount using the correction amount deriving unit 132 will be described in detail.

In addition, as the correction method, for example, there are a linear correction in which each line is corrected using a constant correction amount, and a non-linear correction in which each line is corrected using a non-constant correction amount in a frame period of a correction target. Here, a calculation method of a correction amount when the correction is performed using the linear correction will be described with reference to FIGS. 14A to 14C.

Figures 14A, 14B, 14C:
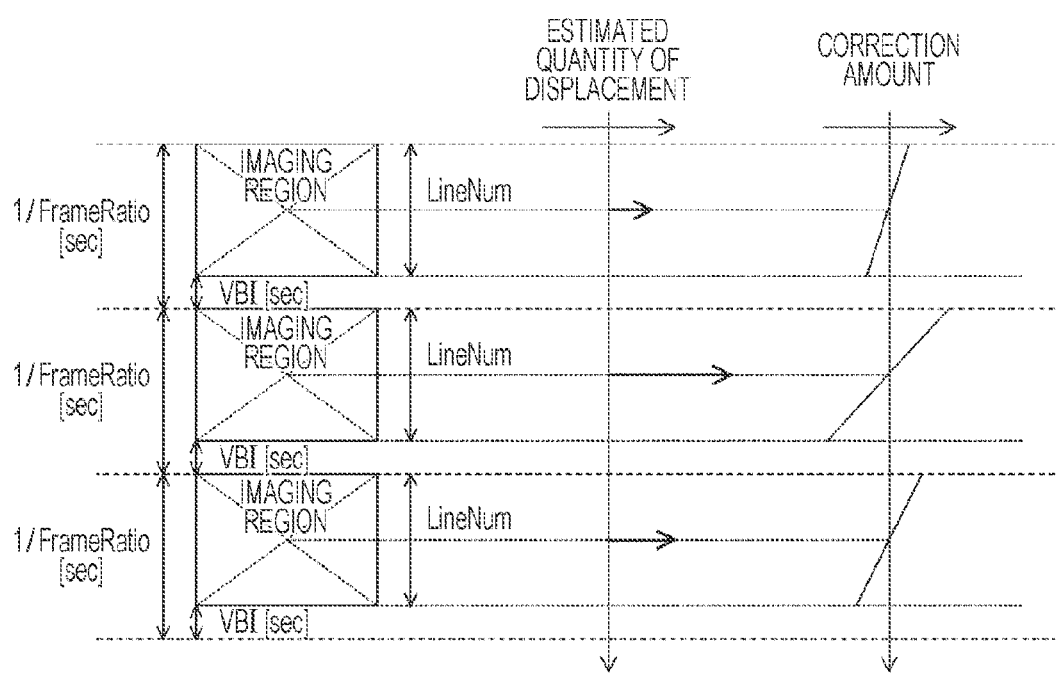
FIGS. 14A to 14C are diagrams which illustrate a relationship between the image as the target of the correction processing using the correction unit according to the first embodiment of the present application and each piece of information used in the correction processing.

As illustrated in FIG. 14A, in imaging using a general image sensor, a predetermined time interval (denoted by Vertical Blanking Interval (VBI) in FIG. 14A) is present between each of frames. Therefore, it is possible to obtain a position correction amount in the horizontal direction (Correction Value for Horizontal Displacement (CVHD)) of a certain line (for example, kth line) of a certain frame (for example, nth frame) using the following formula 13, by taking the time interval (VBI) into consideration.

$$CVHD_{n,k} = CFSP \cdot EDH_n \cdot \frac{1/FrameRatio - VBI}{1/FrameRatio} \cdot \left(\frac{k}{LineNum - 1} - A\right) \quad (13)$$

Here, LineNum is a value which denotes the number of imaging lines in one frame. In addition, FrameRatio is a value which denotes the number of imaged sheets per second. In addition, Correction Factor for Sensor Properties (CFSP) is a correction coefficient with respect to an imaged image, and a value (correction coefficient) which is determined based on the following conditional expression (formula 14). That is, CFSP is determined based on imaging information corresponding to the above described conditional expression (formula 9).

$$CFSP = \begin{cases} 0 & \text{Imaging Information Global Shutter} \\ 1 & \text{Imaging Information Vertical imaging forward } directon \\ -1 & \text{Imaging Information Vertical imaging backward } directon \end{cases} \quad (14)$$

In addition, A is a correction-centered adjustment coefficient. For example, when setting A=0.5, A becomes a correction amount in which a center line in an imaging region is set to a center.

For example, a case is assumed in which an estimated quantity of displacement which is derived from the quantity of displacement estimation unit 131 is set to an estimated quantity of displacement which is illustrated in FIG. 14B. In this case, the correction amount deriving unit 132 calculates a correction amount using formula 13 as illustrated in FIG. 14C.

In addition, the correction processing unit 133 creates a corrected image by performing a correction with respect to an imaged image based on a correction amount which is derived from the correction amount deriving unit 132. For example, the correction processing unit 133 creates the corrected image which is illustrated in FIG. 12E with respect to the imaged image illustrated in FIG. 12B based on a correction amount in each line illustrated in FIG. 12D.

In this manner, the correction unit 130 performs a correction of focal plane distortion with respect to moving image contents based on an imaging direction which is determined by the determination unit 120, when it is determined that the shutter system is the focal plane shutter system using the determination unit 120. On the other hand, the correction unit 130 does not perform the correction of focal plane distortion with respect to moving image contents when it is determined that the shutter system is the global shutter system using the determination unit 120.

In FIGS. 12A to 12E and FIGS. 14A to 14C, examples in which a correction is performed by calculating a linear correction amount in one frame period have been illustrated, however, the correction may be performed by calculating a non-linear correction amount.

In addition, hitherto, a correction in the horizontal direction has been described, however, it is possible to perform a correction with respect to the vertical direction using the same method. That is, in the correction in the horizontal direction, displacement in the horizontal direction has been corrected in each line, however, in the correction in the vertical direction, displacement (expansion and contraction) in the vertical direction is corrected in each line.

In this manner, it is possible to perform appropriate correction processing with respect to moving image contents, and to perform a stable correction.

Operation Example of Image Processing Device

FIG. 15 is a flowchart which illustrates an example of processing order of correction processing using the image processing device 100 according to the first embodiment of the present application. In addition, in FIG. 15, an example in which a vertical imaging direction is determined as imaging information is illustrated.

First, the determination unit 120 initializes a reference frame index, the integration value of quantity of motion of the forward direction frame boundary, and the integration value of quantity of motion of the backward direction frame boundary (Step S901). Here, the reference frame index is, for example, an index for specifying a frame which is a processing target. For example, the determination unit 120 initializes the reference frame index so as to indicate a top frame which configures moving image contents which are recorded in the moving image contents recording unit 110. In addition, for example, the determination unit 120 initializes the respective integration value of quantity of motion of the forward direction frame boundary and integration value of quantity of motion of the backward direction frame boundary using zero.

Subsequently, the determination unit 120 obtains a frame which is indicated by the reference frame index from the moving image contents which are recorded in the moving image contents recording unit 110, and obtains a local movement vector from each region in the frame (Step S902). For example, as illustrated in FIGS. 8B and 8C, local movement vectors are obtained from eight regions in a frame.

Subsequently, the determination unit 120 calculates the quantity of motion of the forward direction frame boundary, and the quantity of motion of the backward direction frame boundary using the obtained local movement vectors (Step S903). That is, the determination unit 120 calculates the quantity of motion of the forward direction frame boundary (NormalFrameDiff$_n$) using the above described formula 1, and calculates the quantity of motion of the backward direction frame boundary (InverseFrameDiff$_n$) using the above described formula 2.

Subsequently, the determination unit 120 calculates the integration value of quantity of motion of the forward direction frame boundary, and the integration value of quantity of motion of the backward direction frame boundary by adding the respective quantity of motion of the forward direction frame boundary and quantity of motion of the backward direction frame boundary to each integration value (Step S904). That is, the determination unit 120 calculates the integration value of quantity of motion of the forward direction frame boundary (NormalDiffSum) using the above described formula 3, and calculates the integration value of quantity of motion of the backward direction frame boundary (InverseDiffSum) using the above described formula 4. In addition, as described above, when a local movement vector is not detected with respect to the top frame, each integration value may be calculated using the above described formulas 5 and 6.

Subsequently, the determination unit 120 updates the reference frame index by updating the index as much as a regulated amount (Step S905). For example, a value of the reference frame index is incremented, and 1 is added.

Subsequently, the determination unit 120 checks the reference frame index, and determines whether or not a period of the reference frame is ended (Step S906). For example, the determination unit 120 determines whether or not a frame which is indicated by the reference frame index is a rear end frame of the moving image contents which are recorded in the moving image contents recording unit 110. In addition, when the frame which is indicated by the reference frame index is the rear end frame, the determination unit 120 determines that the period of the reference frame is ended.

When the period of the reference frame is not ended (Step S906), the process returns to Step S902. On the other hand, when the period of reference frame is ended (Step S906), the determination unit 120 performs determination on imaging information using the integration value of quantity of motion of the forward direction frame boundary, and the integration value of quantity of motion of the backward direction frame boundary (Step S907). That is, the determination unit 120 makes a determination using the above described determination condition (formula 7), and obtains the vertical imaging direction as the imaging information. In addition, Step S907 is an example of a determination procedure which is described in claims.

Subsequently, the correction unit 130 performs correction processing of focal plane distortion with respect to the moving image contents which are recorded in the moving image contents recording unit 110 based on a determination result using the determination unit 120 (Step S908).

In addition, when determining a shutter system of the image sensor (global shutter system, focal plane shutter system) as the imaging information, the determination is made along with the vertical imaging direction in Step S907. In this case, when it is determined that the shutter system of the image sensor is the global shutter system, the correction processing of focal plane distortion in Step S908 is omitted.

2. Modification Example

In the first embodiment of the present application, an example in which a quantity of displacement of an image sensor at a time of imaging operation is estimated using the quantity of displacement estimation unit 131 has been described. Here, an imaging device on which a sensor for detecting a posture of a device (for example, gyro sensor) is mounted is present. When an imaging operation is performed using the imaging device, for example, it is considered that an amount of hand shake in each line at the time of imaging operation is obtained using the sensor, and information related to the obtained amount of hand shake is recorded by being included in meta information of moving image contents. In this manner, it is possible to use information related to the amount of hand shake at the time of image processing, by recording the information related to the amount of hand shake in each line at the time of imaging operation in the meta information of the moving image contents. In this case, it is possible to omit the quantity of displacement estimation unit 131.

Therefore, in the modification example according to the embodiment of the present application, an example in which a correction amount is derived using the meta information (information on amount of hand shake in each line at time of imaging operation) of the moving image contents is illustrated.

Configuration Example of Correction Unit

Figure 16:
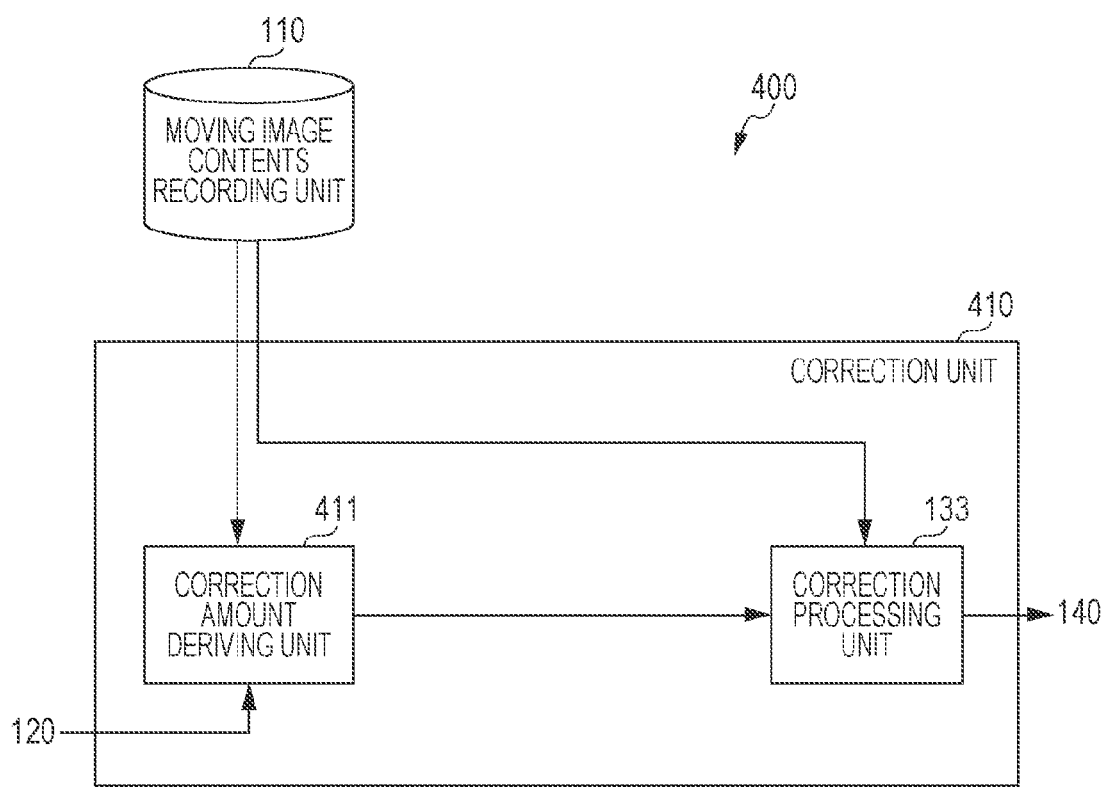
FIG. 16 is a block diagram which illustrates a functional configuration example of an image processing device according to a modification example of the embodiment of the present application.

FIG. 16 is a block diagram which illustrates a functional configuration example of an image processing device 400 in the modification example according to the embodiment of the present application. In addition, in the image processing device 400, a part of the image processing device 100 illustrated in FIG. 1 is modified, and only the correction unit 130 illustrated in FIG. 1 is different. For this reason, in FIG. 16, only a part of configurations of the image processing device 400 (configuration corresponding to FIG. 11) is illustrated, and illustrations of other configurations are omitted. In addition, common portions to the image processing device 100 are given the same reference numerals, and descriptions of a part of these are omitted.

The image processing device 400 includes a moving image contents recording unit 110, a determination unit 120, a correction unit 410, and an output unit 140. In addition, the correction unit 410 includes a correction amount deriving unit 411 and a correction processing unit 133. That is, in the correction unit 410, the quantity of displacement estimation unit 131 in the correction unit 130 illustrated in FIG. 11 is omitted.

In addition, it is assumed that information related to an amount of hand shake in each line at the time of imaging operation is recorded in moving image contents which are recorded in the moving image contents recording unit 110 as meta information by being correlated.

The correction amount deriving unit 411 derives a correction amount in each line of each frame period based on the meta information (information on amount of hand shake in each line at time of imaging operation) of the moving image contents which are recorded in the moving image contents recording unit 110, and a determination result (imaging information) using the determination unit 120. The same deriving example of the correction amount as that in the first embodiment of the present application is applied except for a point that the amount of hand shake in each line at the time of imaging operation is used instead of an estimated quantity of displacement.

CONCLUSION

In this manner, according to the embodiment of the present application, it is possible to obtain imaging information of an image sensor at a time of imaging operation (vertical imaging direction) by appropriately determining the imaging information, even in a case of moving image contents of which imaging information at the time of imaging operation is not known. It is possible to prevent a correction of focal plane distortion due to a correction using a wrong imaging direction from failing, by performing a correction of focal plane distortion using the imaging information (vertical imaging direction) which is obtained in this manner. In this manner, it is possible to obtain high stability, and to perform a correction of focal plane distortion with high precision. That is, it is possible to perform an appropriate correction of focal plane distortion in which imaging information at the time of imaging operation is appropriately reflected.

That is, according to the embodiment of the present application, it is possible to execute a robust correction (correction of focal plane distortion) which attenuates hand shake, and distortion of an imaged image due to a focal plane phenomenon which occurs in a CMOS image sensor, or the like. In addition, it is possible to appropriately determine an imaging direction of an image sensor at the time of imaging operation which is necessary in the correction.

In addition, according to the embodiment of the present application, it is possible to obtain imaging information (shutter system of image sensor) of the image sensor at the time of imaging operation by appropriately determining the imaging information, even in moving image contents of which imaging information at the time of imaging operation is not known. In this manner, even when the moving image contents of which the imaging information at the time of imaging operation is not known are imaged using a CCD image sensor in which focal plane distortion does not occur in principle, it is possible to prevent the correction from being erroneously performed.

In this manner, according to the embodiment of the present application, it is possible to appropriately perform correction processing such as a correction of the focal plane distortion with respect to moving image contents of which imaging information at the time of imaging operation is not known in a cloud environment, or the like, for example. In addition, it is possible to appropriately perform correction processing such as the correction of the focal plane distortion with respect to moving image contents of which imaging information at the time of imaging operation is not known, in moving image editing software, moving image reproducing software, or the like, for example.

In addition, in the embodiment of the present application, the image processing devices 100 and 400 which are integrally configured have been described as examples. However, it is also possible to apply the embodiment of the present application to an image processing system in which each function of the image processing devices 100 and 400 is executed using a plurality of devices. For example, it is also possible to apply the embodiment of the present application to an image processing system in which a plurality of devices corresponding to the moving image contents recording unit 110, the determination unit 120, the correction units 130 and 410, and the output unit 140 are connected using a network. In addition, the network is, for example, a network such as a telephone network, the Internet (for example, public line network), or a wired network or a coaxial cable.

In addition, the above described embodiment is an example for embodying the present application, and matters in the embodiment and matters used to define the present application in claims have correspondence, respectively. Similarly, the matters used to define the present application in claims and the matters in the embodiment of the present application to which the same name is attached have correspondence, respectively. However, the present application is not limited to the embodiment, and can be embodied by performing various modifications with respect to the embodiment without departing from the scope of the present application.

In addition, the processing procedure which is described in the above described embodiment may be treated as a method having a series of these procedures, and may be treated as a program for executing the series of procedures in a computer, and a recording medium which records the program. As the recording medium, it is possible to use a Compact Disc (CD), a MiniDisc (MD), a Digital Versatile Disc (DVD), a memory card, a Blu-ray (registered trademark) Disc, or the like, for example.

In addition, effects which are described in the specification are merely examples, are not limited, or may be another effect.

In addition, the present application can also be configured as follows.

(1) An image processing device which includes a determination unit which determines a scheme of capturing a pixel value of an imaging element at a time of imaging operation of moving image contents using a feature amount which is obtained from a plurality of regions in a frame which configures the moving image contents.

(2) The image processing device described in (1), in which the determination unit determines at least one of an imaging direction and a shutter system of the imaging element at the time of imaging operation, as the capturing scheme.

(3) The image processing device described in (1) or (2), in which the determination unit makes the determination based on continuity of local movement vectors between frames which are neighboring time sequentially among frames which configure the moving image contents, by obtaining the local movement vector in each of the plurality of regions as the feature amount.

(4) The image processing device described in any one of (1) to (3), in which the determination unit obtains a local movement vector for each of the plurality of regions as the feature amount, sets frames which are neighboring time sequentially among frames which configure the moving image contents to a first frame and a second frame, and makes the determination based on a comparison result of a local movement vector which is obtained from a region on one end side in a specific direction of the first frame, and a local movement vector which is obtained from a region on the other end side in the specific direction of the second frame.

(5) The image processing device described in (4), in which the determination unit makes the determination using a value which is calculated based on a comparison result of a first movement vector and a fourth movement vector, and a comparison result of a second movement vector and a third movement vector the first movement vector being the local movement vector obtained from a region on the one end side of the first frame, the second movement vector being the local movement vector obtained from the region on the other end side of the first frame, the third movement vector being the local movement vector obtained from a region on the one end side of the second frame, and the fourth movement vector being the local movement vector obtained from a region on the other end side of the second frame.

(6) The image processing device described in any one of (1) to (5), in which a correction unit which performs a correction of focal plane distortion with respect to the moving image contents based on the determined capturing scheme is further included.

(7) The image processing device described in (6), in which the determination unit determines at least one of the imaging direction and the shutter system of the imaging element at the time of imaging operation as the capturing scheme, and the correction unit performs the correction of the focal plane distortion with respect to the moving image contents based on the determined imaging direction when it is determined that the shutter system is a focal plane shutter system by the determination unit, and does not perform the correction of the focal plane distortion with respect to the moving image contents when it is determined that the shutter system is a global shutter system by the determination unit.

(8) The image processing device described in any one of (1) to (7), in which the determination unit obtains a feature amount in each of the plurality of regions based on a comparison result of a plurality of regions in a target frame which configures the moving image contents and another frame.

(9) An image processing method in which a scheme of capturing a pixel value of an imaging element at a time of imaging operation of moving image contents is determined using a feature amount which is obtained from a plurality of regions in a frame which configures the moving image contents.

(10) A program which causes a computer to execute a determination procedure which determines a scheme of capturing a pixel value of an imaging element at a time of imaging operation of moving image contents using a feature amount which is obtained from a plurality of regions in a frame which configures the moving image contents.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing device comprising:
a determination unit configured to determine a scheme of capturing a pixel value of an imaging element at a time of imaging operation of moving image contents using a feature amount which is obtained from a plurality of regions in a frame which configures the moving image contents; and
a correction unit configured to perform a correction of focal plane distortion with respect to the moving image contents based on the determined capturing scheme,
wherein the determination unit is configured to determine at least one of the imaging direction and the shutter system of the imaging element at the time of imaging operation as the capturing scheme, and wherein the correction unit is configured to perform the correction of the focal plane distortion with respect to the moving image contents based on the determined imaging direction when it is determined that the shutter system is a focal plane shutter system by the determination unit, and not perform the correction of the focal plane distortion with respect to the moving image contents when it is determined that the shutter system is a global shutter system by the determination unit.

2. The image processing device according to claim 1, wherein the determination unit is configured to determine at least one of an imaging direction or a shutter system of the imaging element at the time of imaging operation as the capturing scheme.

3. The image processing device according to claim 1, wherein the determination unit is configured to make determination based on continuity of local movement vectors between frames which are neighboring time sequentially among frames which configure the moving image contents, by obtaining the local movement vector in each of the regions as the feature amount.

4. The image processing device according to claim 1, wherein the determination unit is configured to obtain a local movement vector for each of the regions as the feature amount, set frames which are neighboring time sequentially among frames which configure the moving image contents to a first frame and a second frame, and make determination based on a comparison result of a local movement vector which is obtained from a region on a first end side in a specific direction of the first frame, and a local movement vector which is obtained from a region on a second end side in the specific direction of the second frame.

5. The image processing device according to claim 4, wherein the determination unit is configured to make the determination using a value which is calculated based on a first comparison result of a first movement vector and a fourth movement vector, and a second comparison result of a second movement vector and a third movement vector, and wherein the first movement vector is the local movement vector obtained from a region on the first end side of the first frame, the second movement vector is the local movement vector obtained from the region on the second end side of the first frame, the third movement vector is the local movement vector obtained from a region on the first end side of the second frame, and the fourth movement vector is the local movement vector obtained from a region on the second end side of the second frame.

6. The image processing device according to claim 1, wherein the determination unit is configured to obtain the feature amount in each of the regions based on a comparison result of a plurality of regions in a target frame which configures the moving image contents and an another frame.

7. An image processing system comprising:
at least one image processing device including:
a determination unit configured to determine a scheme of capturing a pixel value of an imaging element at a time of imaging operation of moving image contents using a feature amount which is obtained from a plurality of regions in a frame which configures the moving image contents; and
a correction unit configured to perform a correction of focal plane distortion with respect to the moving image contents based on the determined capturing scheme,
wherein the determination unit is configured to determine at least one of the imaging direction and the shutter system of the imaging element at the time of imaging operation as the capturing scheme, and wherein the correction unit is configured to perform the correction of the focal plane distortion with respect to the moving image contents based on the determined imaging direction when it is determined that the shutter system is a focal plane shutter system by the determination unit, and not perform the correction of the focal plane distortion with respect to the moving image contents when it is determined that the shutter system is a global shutter system by the determination unit.

8. The image processing system according to claim 7, wherein the determination unit is configured to determine at least one of an imaging direction or a shutter system of the imaging element at the time of imaging operation as the capturing scheme.

9. The image processing system according to claim 7, wherein the determination unit is configured to make determination based on continuity of local movement vectors between frames which are neighboring time sequentially among frames which configure the moving image contents, by obtaining the local movement vector in each of the regions as the feature amount.

10. The image processing system according to claim 7, wherein the determination unit is configured to obtain a local movement vector for each of the regions as the feature amount, set frames which are neighboring time sequentially among frames which configure the moving image contents to a first frame and a second frame, and make determination based on a comparison result of a local movement vector which is obtained from a region on a first end side in a specific direction of the first frame, and a local movement vector which is obtained from a region on a second end side in the specific direction of the second frame.

11. The image processing system according to claim 10, wherein the determination unit is configured to make the determination using a value which is calculated based on a first comparison result of a first movement vector and a fourth movement vector, and a second comparison result of a second movement vector and a third movement vector, and wherein the first movement vector is the local movement vector obtained from a region on the first end side of the first frame, the second movement vector is the local movement vector obtained from the region on the second end side of the first frame, the third movement vector is the local movement vector obtained from a region on the first end side of the second frame, and the fourth movement vector is the local movement vector obtained from a region on the second end side of the second frame.

12. The image processing system according to claim 7, wherein the determination unit is configured to obtain the feature amount in each of the regions based on a comparison result of a plurality of regions in a target frame which configures the moving image contents and an another frame.

13. The image processing system according to claim 7, wherein at least two image processing devices are connected by a network.

14. The image processing system according to claim 7, further comprising:
a storage unit configured to store the moving image contents.

15. An image processing device comprising:
a determination unit configured to determine a scheme of capturing a pixel value of an imaging element at a time of imaging operation of moving image contents using a feature amount which is obtained from a plurality of regions in a frame which configures the moving image contents; and
a correction unit configured to perform a correction of focal plane distortion with respect to the moving image contents based on the determined capturing scheme, wherein the determination unit is configured to obtain a local movement vector for each of the regions as the feature amount, set frames which are neighboring time sequentially among frames which configure the moving image contents to a first frame and a second frame, and make determination based on a comparison result of a local movement vector which is obtained from a region on a first end side in a specific direction of the first frame, and a local movement vector which is obtained from a region on a second end side in the specific direction of the second frame.

16. An image processing system comprising:

at least one image processing device including:

a determination unit configured to determine a scheme of capturing a pixel value of an imaging element at a time of imaging operation of moving image contents using a feature amount which is obtained from a plurality of regions in a frame which configures the moving image contents; and a correction unit configured to perform a correction of focal plane distortion with respect to the moving image contents based on the determined capturing scheme, wherein the determination unit is configured to obtain a local movement vector for each of the regions as the feature amount, set frames which are neighboring time sequentially among frames which configure the moving image contents to a first frame and a second frame, and make determination based on a comparison result of a local movement vector which is obtained from a region on a first end side in a specific direction of the first frame, and a local movement vector which is obtained from a region on a second end side in the specific direction of the second frame.

* * * * *